(12) United States Patent
Chu et al.

(10) Patent No.: US 11,913,864 B2
(45) Date of Patent: Feb. 27, 2024

(54) SMOKE DETECTOR WITH INCREASED SCATTERED LIGHT INTENSITY

(71) Applicant: PixArt Imaging Inc., Hsin-Chu County (TW)

(72) Inventors: Yen-Chang Chu, Hsin-Chu County (TW); Cheng-Nan Tsai, Hsin-Chu County (TW); Chih-Ming Sun, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 8 days.

(21) Appl. No.: 17/740,392

(22) Filed: May 10, 2022

(65) Prior Publication Data

US 2022/0268682 A1 Aug. 25, 2022

Related U.S. Application Data

(63) Continuation-in-part of application No. 17/320,222, filed on May 14, 2021, now Pat. No. 11,615,684.

(60) Provisional application No. 63/117,479, filed on Nov. 24, 2020.

(51) Int. Cl.
*G01N 15/06* (2006.01)
*G08B 17/107* (2006.01)
*G08B 29/18* (2006.01)
*G01N 15/00* (2006.01)

(52) U.S. Cl.
CPC ........... *G01N 15/06* (2013.01); *G08B 17/107* (2013.01); *G08B 29/18* (2013.01); *G01N 2015/0046* (2013.01); *G01N 2015/0693* (2013.01)

(58) Field of Classification Search
CPC .................................................. G08B 17/107
See application file for complete search history.

(56) References Cited

U.S. PATENT DOCUMENTS

| 4,469,953 A * | 9/1984 | Fujisawa | G08B 17/113 356/338 |
| 4,906,978 A | 3/1990 | Best et al. | |
| 5,280,272 A | 1/1994 | Nagashima et al. | |
| 6,521,907 B1 * | 2/2003 | Shoaff | G08B 17/107 356/628 |
| 2004/0063154 A1 | 4/2004 | Booth et al. | |
| 2006/0261967 A1 * | 11/2006 | Marman | G08B 29/26 340/630 |
| 2009/0009348 A1 | 1/2009 | Mizuo | |
| 2010/0328085 A1 * | 12/2010 | Bohanon | G08B 29/24 340/630 |
| 2011/0031419 A1 | 2/2011 | Fukui et al. | |
| 2012/0050030 A1 * | 3/2012 | Murphy | G08B 29/145 340/514 |

(Continued)

FOREIGN PATENT DOCUMENTS

| CN | 103782327 A | 5/2014 |
| CN | 207489209 U | 6/2018 |

*Primary Examiner* — Travis R Hunnings
(74) *Attorney, Agent, or Firm* — WPAT, P.C

(57) ABSTRACT

There is provided a smoke detector including a substrate, a light source and a light sensor. The light source and the light sensor are arranged adjacently on the substrate. The substrate is arranged with an asymmetric structure to cause an illumination region of the light source to deviate toward the light sensor thereby increasing a ratio of light intensity reflected by smoke with respect to reference light intensity.

14 Claims, 15 Drawing Sheets

(56) References Cited

U.S. PATENT DOCUMENTS

| | | | |
|---|---|---|---|
| 2013/0033699 A1* | 2/2013 | Brigham | G08B 17/107 |
| | | | 356/338 |
| 2013/0201479 A1 | 8/2013 | Vollenweider | |
| 2014/0111803 A1* | 4/2014 | Matsukuma | G08B 17/113 |
| | | | 356/338 |
| 2015/0146204 A1* | 5/2015 | Shibuya | G08B 17/113 |
| | | | 356/338 |
| 2015/0302727 A1* | 10/2015 | Piccolo, III | G08B 17/107 |
| | | | 340/514 |
| 2016/0140817 A1* | 5/2016 | Beagley | G08B 13/1645 |
| | | | 340/555 |
| 2017/0287318 A1* | 10/2017 | Moffa | G08B 29/043 |
| 2018/0180540 A1* | 6/2018 | Iguchi | G08B 17/10 |
| 2018/0306715 A1* | 10/2018 | Yamasaki | G01N 21/53 |
| 2020/0175848 A1* | 6/2020 | Deliwala | G01N 21/274 |
| 2021/0166542 A1* | 6/2021 | Patel | G08B 29/145 |
| 2021/0295667 A1* | 9/2021 | Zu | G08B 17/113 |
| 2021/0312779 A1* | 10/2021 | Gadonniex | G08B 17/107 |
| 2022/0358820 A1* | 11/2022 | Muro | G08B 17/06 |
| 2023/0206743 A1 | 6/2023 | Tsai et al. | |

\* cited by examiner

| profile1 | intensity>=A1,slope>=B1,signal ratio<=C1 ... | interval 1 | smoke type1 |
|---|---|---|---|
| profile2 | intensity>=A2,slope>=B2,signal ratio<=C2 ... | interval 2 | smoke type2 |
| profile3 | intensity>=A3,slope>=B3,signal ratio<=C3 ... | interval 3 | smoke type3 |
| profile4 | intensity>=A4,slope>=B4,signal ratio<=C4 ... | interval 4 | smoke type4 |

FIG. 6

SMOKE DETECTOR WITH INCREASED SCATTERED LIGHT INTENSITY

CROSS REFERENCE TO RELATED APPLICATION

The present application is a continuation-in-part application of U.S. patent application Ser. No. 17/320,222 filed on, May 14, 2021, which claims the priority benefit of U.S. Provisional Application Ser. No. 63/117,479, filed on Nov. 24, 2020, the disclosures of which are hereby incorporated by reference herein in their entirety.

BACKGROUND

1. Field of the Disclosure

This disclosure generally relates to a smoke detector and, more particularly, to a smoke detector that reduces the possibility of false alarm and is adaptable to different standards.

2. Description of the Related Art

In current optoelectronic smoke detectors, a light sensor does not receive any reflected light of a light source when there is no smoke. The light sensor receives reflected or scattered light of the light source only when there is smoke entering the smoke detector. Meanwhile, an inner surface of the smoke detector is coated with light absorption material to avoid inner reflection without smoke therein. However, when there is enough dust accumulated in the smoke detector, the inner reflection of light inside the smoke detector is still generated and received by the light sensor such that a false alarm may be triggered.

The scattered smoke detector operates in a way that when scattered light intensity generated by the smoke is larger than a single alarm threshold, the alarm is activated.

However, due to the smoke generated by different types of fire having different interactions with light, e.g., smoke generated by smolder creating multiple times of scattered light than smoke generated by flame, the single alarm threshold can cause the smoke detector to be too sensitive to some types of smoke to trigger a false alarm but not sensitive enough to other types of smoke to delay the alarm time.

Furthermore, the environment generally has many disturbances such as moisture, vapor, oil smoke, fume, particles and bugs that may change the reflected light intensity to cause a false alarm. The commercial available smoke detector has a high false alarm rate due to these reasons, but the false alarm can be treated only by negative methods such as not to arrange the smoke detector in a spot having high disturbances (e.g., kitchen, bathroom or garage) to reduce the possibility of false alarm, but there is no complete and useful solving method.

Accordingly, the present disclosure provides a smoke detector that effectively reduces the false alarm rate and is adaptable to different standards.

SUMMARY

The present disclosure provides a smoke detector that detects reference light energy when there is no smoke entering the smoke detector, and the reference light energy is used as a reference in identifying whether a fire occurs.

The present disclosure further provides a smoke detector that avoids reflected light from accumulated dust being received by a light sensor so as to reduce the false alarm rate.

The present disclosure further provides a smoke detector that automatically adjusts or alters multiple condition thresholds according to the detection result of a light sensor so as to reduce the false alarm rate.

The present disclosure further provides a smoke detector that moves an illumination region of a light source toward a light sensor to increase scattered light intensity.

The present disclosure provides a smoke detector including a substrate, a light source, a light sensor and a ring wall. The light source and the light sensor are arranged on an upper surface of the substrate. The ring wall is arranged on the upper surface of the substrate and surrounding the light source, and is configured to move an illumination range of the light source toward the light sensor.

The present disclosure further provides a smoke detector including a substrate, a light source, a light sensor and a light directing element. The light source and the light sensor are arranged on an upper surface of the substrate. The light directing element is configured to move an illumination range of the light source toward to light sensor.

The present disclosure further provides a smoke detector including a substrate, a light sensor, a sub-substrate and a light source. The light sensor is arranged on an upper surface of the substrate. The sub-substrate is arranged on the upper surface of the substrate and electrically connected to the substrate, wherein a first surface of the sub-substrate is tilted toward the light sensor. The light source is arranged on the first surface of the sub-substrate.

BRIEF DESCRIPTION OF THE DRAWINGS

Other objects, advantages, and novel features of the present disclosure will become more apparent from the following detailed description when taken in conjunction with the accompanying drawings.

FIG. 6 is a schematic diagram of multiple sets of predetermined condition thresholds corresponding to different profiles of detection signal and different types of smoke configured in a smoke detector of the present disclosure.

DETAILED DESCRIPTION OF THE EMBODIMENT

It should be noted that, wherever possible, the same reference numbers will be used throughout the drawings to refer to the same or like parts.

The smoke detector of the present disclosure has a processor which is embedded with a categorizer for distinguishing different types of smoke or particles to accordingly change condition thresholds for triggering an alarm based on the detection result so as to reduce the false alarm rate. Furthermore, the smoke detector of the present disclosure is further arranged with protrusion structures to block scattered and reflected light from accumulated dust and/or arranged with multiple light sources for distinguishing a type of disturbance. Said disturbance includes the smoke, particle, vapor and dust.

Figure 1A:
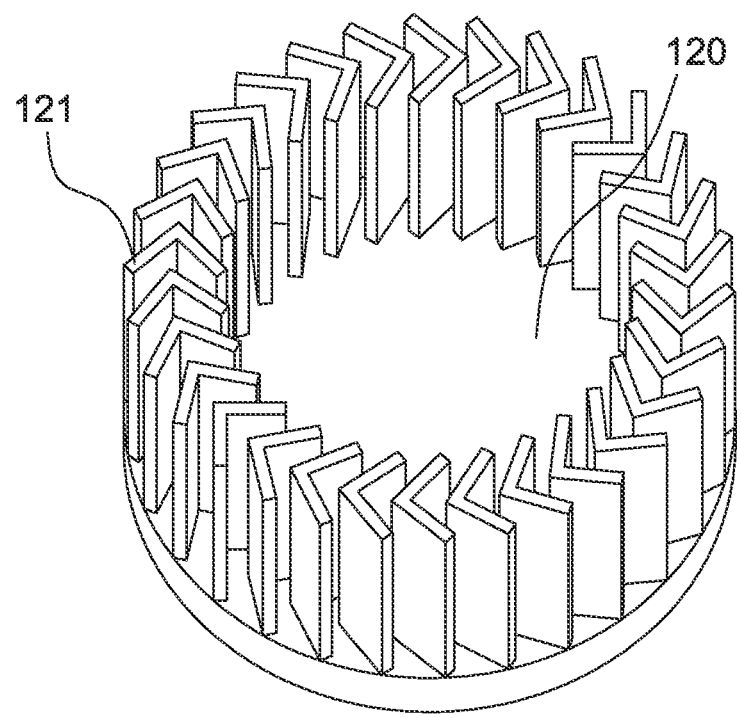
FIG. 1A is a solid diagram of a cover of a smoke detector according to a first embodiment of the present disclosure.
Figure 1B:
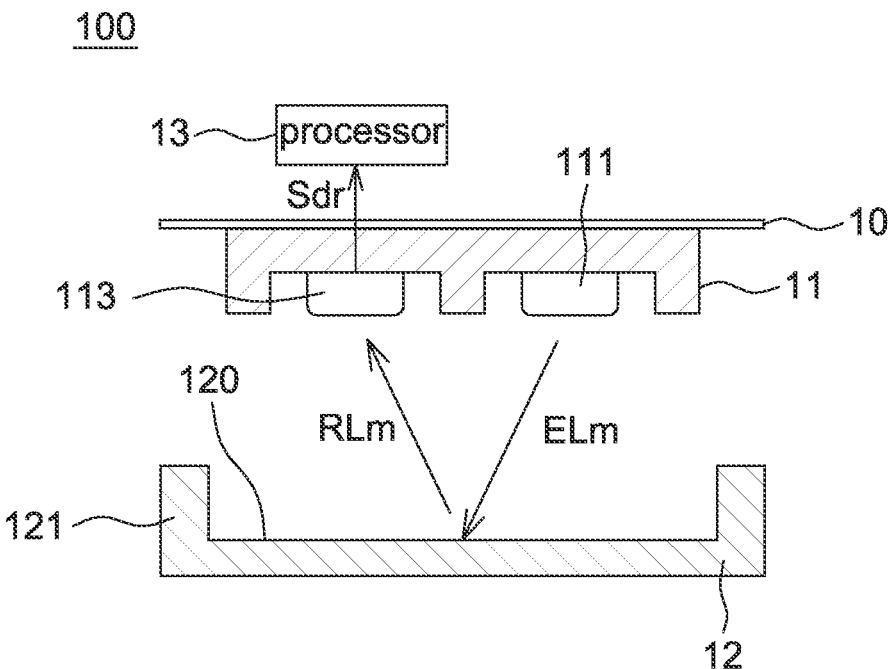
FIG. 1B is a cross sectional view of a smoke detector according to a first embodiment of the present disclosure.
Figure 1C:
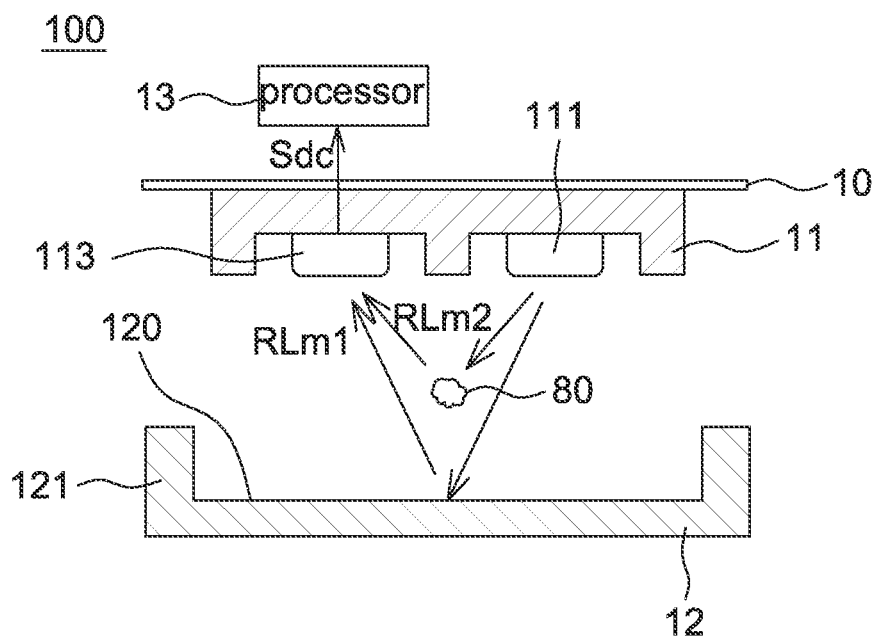
FIG. 1C is another cross sectional view of a smoke detector according to a first embodiment of the present disclosure.

Referring to FIGS. 1A to 1C, FIG. 1A is a solid diagram of a cover 12 of a smoke detector 100 according to a first embodiment of the present disclosure; FIG. 1B is a cross sectional view of the smoke detector 100 according to a first embodiment of the present disclosure; and FIG. 1C is another cross sectional view of the smoke detector 100 according to a first embodiment of the present disclosure which shows that the reflected light is increased due to smoke 80 entering a sensing space of the smoke detector 100.

The smoke detector 100 includes a sensing device 11 and a cover 12. The cover 12 covers on the sensing device 11 such that the sensing device 11 is arranged inside an inner space (configured as the sensing space) of the cover 12. For example, the sensing device 11 is arranged on a base 10 which has an area larger than or equal to that of the cover 12. One side of the base 10 is combined with the cover 12 and the other side thereof is attached to a wall or ceiling on which the smoke detector 100 is arranged. The material of the base 10 is, for example, plastic, glass or wood plate without particularly limitations.

The cover 12 includes a reflective surface 120 and a side wall 121. The side wall 121 extends out from an edge or a region close to the edge of the reflective surface 120, e.g., FIGS. 1B and 1C showing that the side wall 121 perpendicularly extends out from the reflective surface 120 toward the sensing device 11, but the side wall 121 is not limited to be perpendicular to the reflective surface 120, e.g., having a tilt angle. To allow the air (including smoke if existence) to enter the inner space of the smoke detector 100, the side wall 121 has apertures. For example, FIG. 1A shows one example in which the side wall 121 includes multiple separated pillars extending out from the edge of the reflective surface 120, and spaces between the pillars are used as the apertures. To prevent external light from entering the inner space of the smoke detector 100 to degrade the sensing ability, the side wall 121 is preferably arranged in a way that the inner space is not seen from outside of the cover 12, but the shape of the pillars is not limited to that shown in FIG. 1A. The reflective surface 120 is used to reflect emission light of the light source 111.

In another aspect, the side wall 121 extends out from the base 10 (e.g., downward in FIGS. 1B and 1C), and the cover 12 is a plate without any sidewall. The cover 12 seals the sensing space of the smoke detector 100 by attaching to the top of the side wall 121 on the base 10. In an alternative aspect, the base 10 and the cover 12 have respective side walls 121 opposite to each other, and the cover 12 seals the sensing space of the smoke detector 100 by combining tops of the side walls 121 of the base 10 and the cover 12 together. The cover 12 is combined to the base 10 using adhesive or fixed member(s) without particular limitations.

The sensing device 11 includes a light source 111, a light sensor 113, and a processor 13 electrically coupled to the light source 111 and the light sensor 113. A light blocking wall is preferably arranged between the light source 111 and the light sensor 113.

The smoke detector of the present disclosure is arranged in the way that when there is no smoke entering the inner space thereof, the light sensor still receives reference light intensity to generate a reference detection signal Sdr. The light source 111 is preferably a non-coherent light source, e.g., a light emitting diode. The light source 111 projects a main beam ELm toward the reflective surface 120 to generate a main reflected beam RLm reflected from the reflective surface 120, wherein the main beam ELm herein is referred to light within an emission angle of the light source 111. In other aspects, if light source 111 is arranged with optics to expand an emission angle of the light source 111, the light source 111 could be a laser diode.

The light sensor 113 is, for example, a CMOS image sensor, a photodiode, a SPAD or the like, which senses reflected light (including at least a part of the main reflected beam RLm) from the reflective surface 120 at a predetermined frequency to generate a detection signal. For example, the light sensor 113 is arranged at a path or at a region close to the path of the main reflected beam RLm, but not limited thereto.

The processor 13 is, for example, a micro controller unit (MCU) or an application specific integrated circuit (ASIC). The processor 13 receives a reference detection signal Sdr (as shown in FIG. 1B) from the light sensor 113 when there is no smoke entering or interrupting the main reflected beam RLm, and receives a current detection signal Sdc (as shown in FIG. 1C) from the light sensor 113 when there is smoke entering or interrupting the main reflected beam RLm. In one aspect, the magnitude of the reference detection signal Sdr is determined according to the spatial relationship between the light source 111, the light sensor 113, the side wall 121 and the reflective surface 120 as well as the reflection coefficient of the reflective surface 120.

Figure 9:
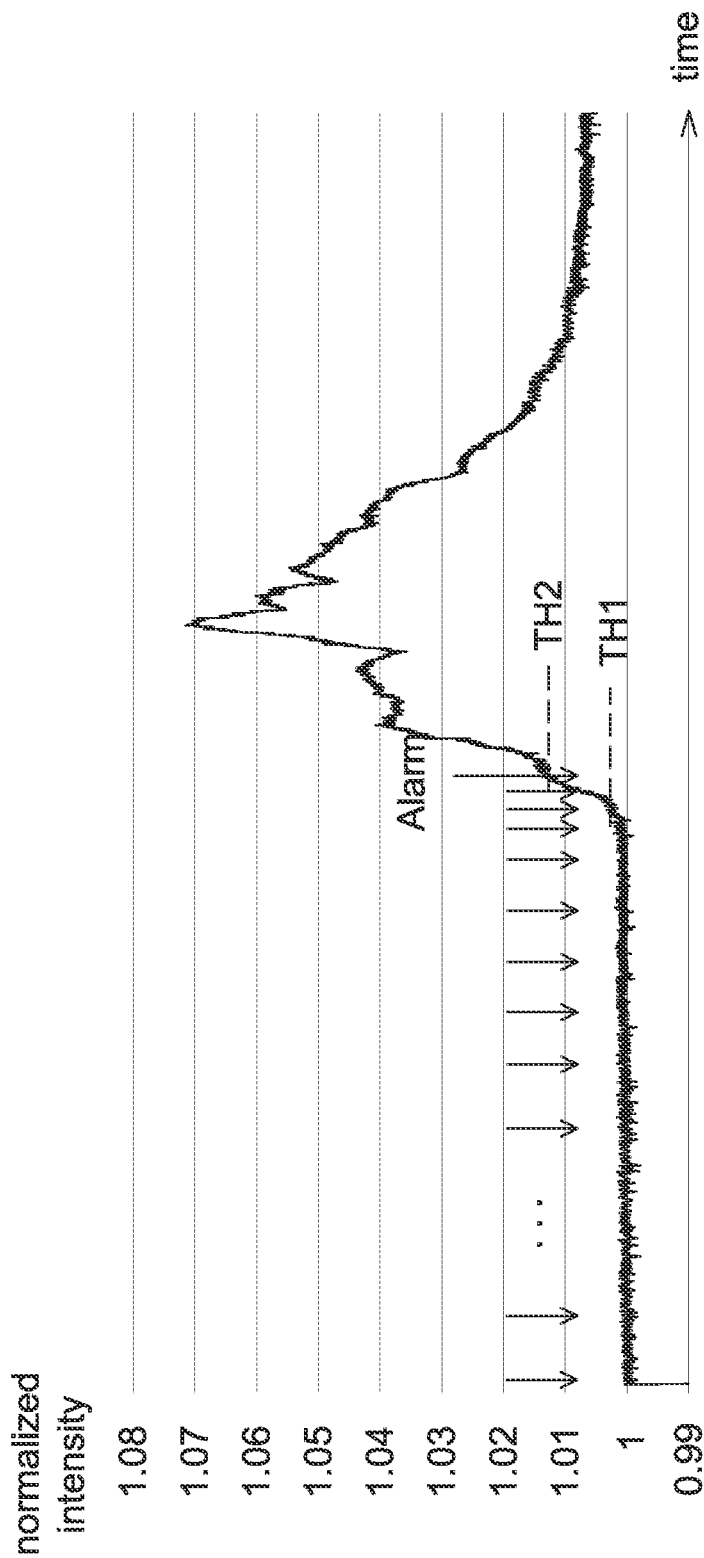
FIG. 9 is an operational schematic diagram of a smoke detector according to one embodiment of the present disclosure in which the smoke detector has changeable sensing frequencies.

The processor 13 identifies whether to give an alarm according to a signal ratio between the current detection signal Sdc and the reference detection signal Sdc, e.g., Sdc/Sdr or (Sdc−Sdr)/Sdr. As shown in FIG. 1C, when the smoke 80 enters the inner space (e.g., intervening a path of the main reflected beam RLm), the light sensor 113 detects both the reflected light RLm1 (reflected by the reflective surface 120) and RLm2 (reflected by the smoke 80) such that Sdc>Sdr, wherein Sdc is generated mainly by a summation of RLm1 and RLm2 as shown in FIG. 1C, and Sdr is generated mainly by RLm as shown in FIG. 1B. For example, when the signal ratio (also called normalized intensity herein) Sdc/Sdr or (Sdc−Sdr)/Sdr exceeds a predetermined value, e.g., TH2 showing in FIG. 9, the processor 13 controls a speaker or the coupled host (not shown) to give an alarm. For example, the smoke detector 100 or said host has a speaker. The normalized intensity in FIG. 9 is calculated by Sdc/Sdr.

More specifically, in the first embodiment, when the light source 111 and the light sensor 113 are arranged substantially at the same height in the inner space, the light source 111 and the light sensor 113 are symmetrically arranged at two sides, e.g., left and right sides in FIG. 1B, of a reflection spot on the reflective surface 120. It is appreciated that when the reflective surface 120 is not parallel to a plane of said same height, the light source 111 and the light sensor 113 are not symmetrically arranged at two sides of the reflection spot. For example, the light sensor 11 is arranged at a region receiving the maximum reflected light.

In another aspect, the light sensor 11 is arranged close to (not at) the region receiving the maximum reflected light in order not to cause the reference detection signal Sdr too large that can reduce the sensitive of the light source 11. As mentioned above, the current detection signal Sdc is larger than the reference detection signal Sdr, intensity of the reference detection signal Sdr is preferably not at the maximum detectable value of the light sensor 113.

Figure 2:
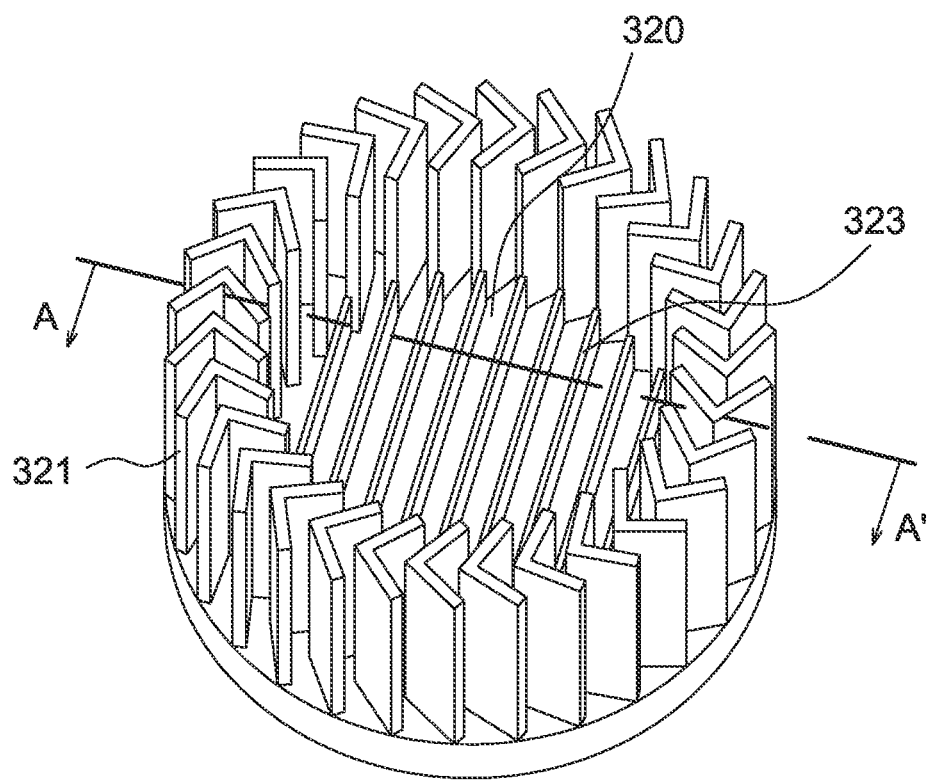
FIG. 2 is a solid diagram of a cover of a smoke detector according to a second embodiment of the present disclosure.
Figure 3:
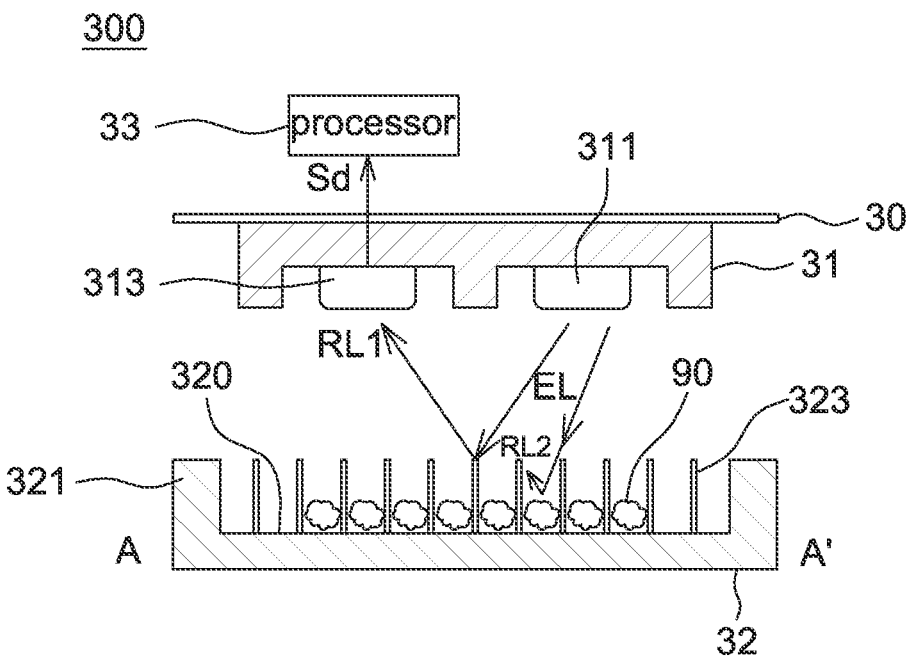
FIG. 3 is a cross sectional view of a smoke detector according to a second embodiment of the present disclosure in which a cross section of the cover is shown along line A-A' in FIG. 2.
Figure 4:
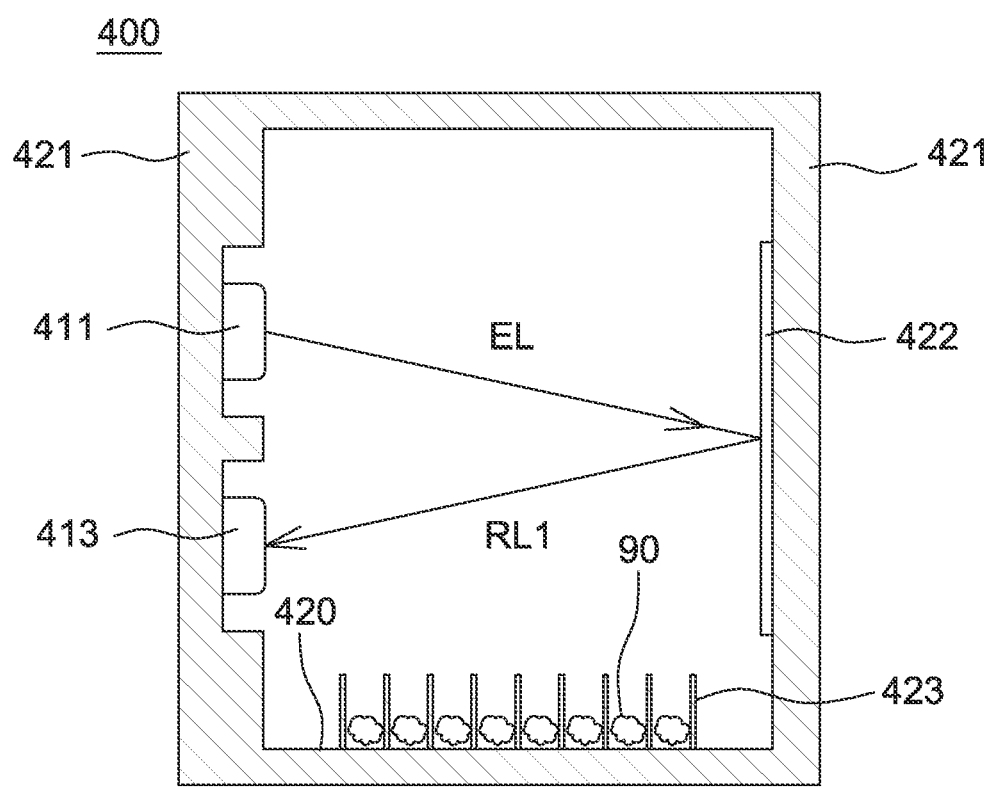
FIG. 4 is a side view of an alternative of a smoke detector according to a second embodiment of the present disclosure.

Please refer to FIGS. 2 to 4, FIG. 2 is a solid diagram of a cover 32 of a smoke detector 300 according to a second embodiment of the present disclosure; FIG. 3 is a cross sectional view of the smoke detector 300 according to a second embodiment of the present disclosure in which a cross section of the cover 32 is shown along line A-A' in FIG. 2; and FIG. 4 is a schematic diagram of an alternative of the smoke detector 300 according to a second embodiment of the present disclosure.

The smoke detector 300 also includes a sensing device 31 and a cover 32. The cover 32 covers on the sensing device 31 such that the sensing device 31 is arranged inside an inner space (configured as a sensing space) of the smoke detector 300. Similarly, the sensing device 31 is arranged on a base 30 which has an area larger than or equal to that of the cover 32. The base 30 is also combined with the cover 32 and attached to a wall or ceiling on which the smoke detector 300 is arranged. Similarly, the material of the base 10 is not particularly limited.

In the second embodiment, the configuration of the sensing device 31 is identical to the sensing device 11 of the first embodiment only being indicated with different reference numerals. The light sensor 313 receives reflected light RL1 of an emission light beam EL of the light source 311 so as to generate a detection signal Sd. The difference between the second embodiment and the first embodiment is at the structure of the cover 32.

The cover 32 includes a bottom surface 320 and a side wall 321. The side wall 321 is identical to the side wall 121 of the first embodiment. The side wall 321 extends out from an edge of the bottom surface 320 and has apertures. For example, the side wall 321 includes multiple separated pillars extending out from the edge of the bottom surface 320. Similar to the first embodiment, the side wall 321 is arranged on the base 30, or on both the bottom surface 320 and the base 30 in different aspects.

In the second embodiment, the bottom surface 320 further includes multiple protrusions 323 extending out from the bottom surface 320. The multiple protrusions 323 are used to block reflected light RL2 reflected by the bottom surface 320 (or dust 90 if accumulated). As shown in FIG. 3, the light sensor 313 mainly receives reflected light RL1 reflected by the upper surface of the multiple protrusions 323 to generate a detection signal Sd. Therefore, even though there is accumulated dust 90 on the bottom surface 320, most of the reflected light RL2 reflected by the dust 90 is blocked by the multiple protrusions 323 without being received by the light sensor 313. Accordingly, whether there is dust 90 accumulated on the bottom surface 320 or not does not affect a reference value of the detection signal Sd (i.e. reference detection signal).

As mentioned above, the present disclosure identifies whether an alarm should be given according to a signal ratio between a current value of the detection signal Sd (i.e. current detection signal) and the reference value of the detection signal Sdr (similar to FIG. 1B when there is no smoke entering the sensing space), e.g., the signal ratio=Sd/Sdr or (Sd−Sdr)/Sdr. According to the configuration of the second embodiment, since the reference value of the detection signal Sdr is not affected by the accumulated dust 90, the false alarm rate is effectively decreased.

It should be mentioned that although FIG. 2 shows that the multiple protrusions 323 are long strips parallel to one another, it is only intended to illustrate but not to limit the present disclosure. In other aspects, the multiple protrusions 323 are separated and interlacedly arranged circular cylinders, triangular cylinders, rectangular cylinders or a combination thereof without particular limitations as long as the reflected light RL2 is blocked. Furthermore, the height of the multiple protrusions 323 is determined according to a transverse distance between the light source 311 and the light sensor 313 as well as a longitudinal height of the sensing space without particular limitations as long as the reflected light RL2 is blocked by the multiple protrusions 323.

Furthermore, although FIG. 3 shows that the long-strip protrusions 323 extend on the whole bottom surface 320, the present disclosure is not limited thereto. In other aspects, the multiple protrusions 323 are arranged only within an illuminated range of the main beam of the light source 311. In another aspect, long-strip protrusions 323 parallel to one another are arranged within the illuminated range of the main beam of the light source 311, and long-strip protrusions 323 extending in different directions are arranged at other regions of the bottom surface 320.

Please refer to FIG. 3 again, in one aspect, the light source 311 and the light sensor 313 are arranged at an opposite surface of the bottom surface 320, and the multiple protrusions 323 are used to block the reflected light RL2 of the emission light beam EL of the light source 311 reflected by the bottom surface 320. As mentioned above, when the bottom surface 320 has accumulated dust 90, the reflected light RL2 is reflected by the dust 90. When the multiple protrusions 323 are long strips, an extending direction of the long strips is preferably perpendicular to a direction (e.g., a left-right direction in FIG. 3) of a transverse component of the emission light beam EL of the light source 311 so as to block the reflected light RL2 effectively.

Please refer to FIG. 4, which is a side view of an alternative of a smoke detector 400 according to a second embodiment of the present disclosure. In another aspect, the cover 32 further includes a reflective surface 422 arranged at an inner surface of the side wall 421. The light source 411 and the light sensor 413 are also arranged at the inner surface of the side wall 421 but opposite to the reflective surface 422. Similar to the first embodiment, the side wall 421 extends upward from the cover or downward from the base according to different applications. In this aspect, the reflective surface 422 is not at the bottom surface 420 of the cover, and the material of the reflective surface 422 is not particularly limited as long as the emission light beam EL of the light source 411 is reflected.

More specifically, in this aspect, the light source 411 does not project the emission light beam EL toward the multiple protrusions 423. During operation, the light sensor 413 more or less receives reflected light from the bottom surface 420 (if no protrusion 423 being arranged). The reference value of the detection signal is increased when there is dust 90 accumulated on the bottom surface 420. Therefore, by arranging multiple protrusions 423 on the bottom surface 420, the influence on the reference value of the detection signal by the accumulated dust 90 is decreased so as to reduce the false alarm rate. The multiple protrusions 423 are identical to the multiple protrusions 323 in FIG. 3 and thus details thereof are not repeated herein.

More specifically, the difference between FIG. 4 and FIG. 3 is at the position configuration of the light source and the light sensor. The configuration of FIG. 4 is to cause the emission light beam EL and the reflected light RL1 to propagate upon the multiple protrusions 423. It is appreciated that the smoke detector 400 in FIG. 4 also includes a processor electrically coupled to the light sensor 413 for processing the detection signal therefrom.

Figure 5A:
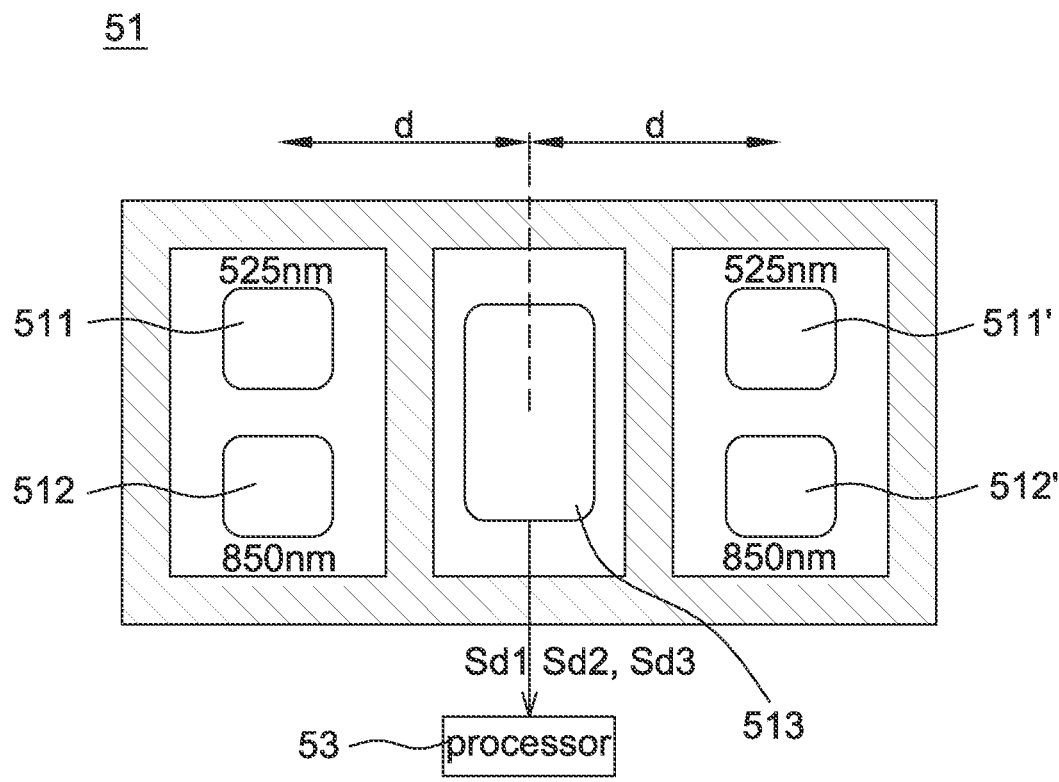
FIG. 5A is a schematic diagram of a sensing device of a smoke detector according to a third embodiment of the present disclosure.
Figure 5B:
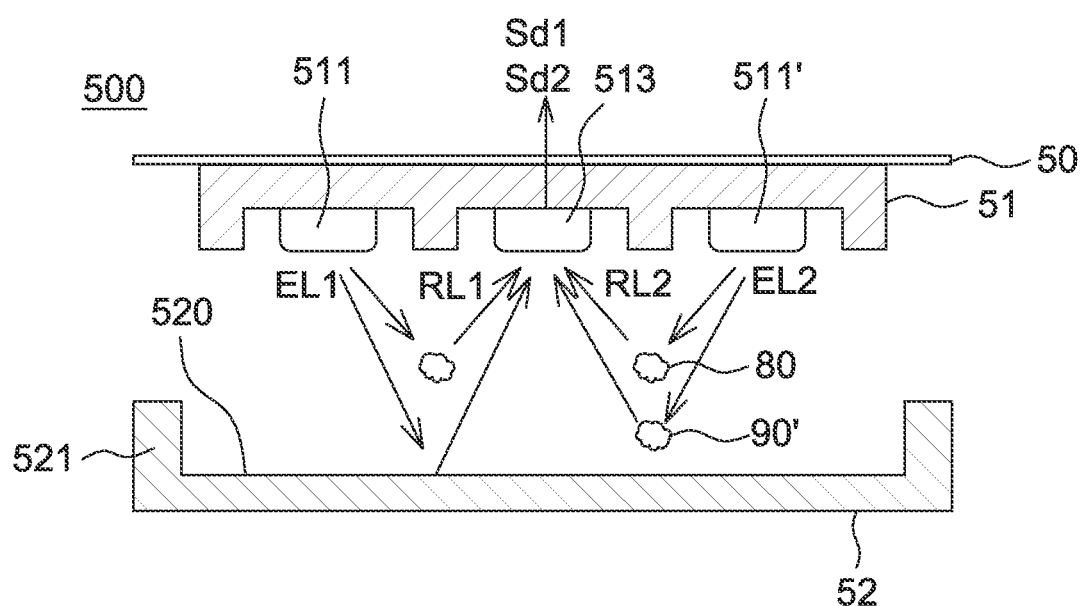
FIG. 5B is a cross sectional view of a smoke detector according to a third embodiment of the present disclosure.

Please refer to FIGS. 5A and 5B, FIG. 5A is a schematic diagram of a sensing device 51 of a smoke detector 500 according to a third embodiment of the present disclosure; and FIG. 5B is a cross sectional view of the smoke detector 500 according to a third embodiment of the present disclosure. The smoke detector 500 also includes a sensing device 51 and a cover 52, wherein the cover 52 is also combined to a base 50 to form a sensing space which has been illustrated above and thus details thereof are not repeated herein.

It should be mentioned that although FIG. 5B shows that the cover 52 is identical to the cover 12 of the first embodiment, the cover 52 is identical to the cover 32 of the second embodiment 32 in another aspect without particular limitations. More specifically, the difference between the third embodiment and the first and second embodiments is at the component arrangement of the sensing device 51.

The sensing device 51 includes a light sensor 513, a processor 53, a first light source 511 (or 512) and a second light source 511' (or 512'). Similar to the first embodiment, the light sensor 513 is a CMOS image sensor or a photodiode or a SPAD without particular limitations. The light sensor 513 is used to detect scattered and reflected light from the cover 52, the smoke 80 or floating particles 90' when different light sources are turned on to generate detection signals, e.g., light intensity signals.

The first light source 511 and the second light source 511' emit light of the same wavelength, e.g., 525 nm or 850 nm, but not limited to. The first light source 511 and the second light source 511' are coherent light sources or non-coherent light sources without particular limitations. The first light source 511 and the second light source 511' are respectively arranged at two opposite sides of the light sensor 513, and preferably having the same distance d from the light source 513, e.g., FIG. 5A showing that the first light source 511 is at the left side of the light sensor 513 and the second light source 511' is at the right side of the light sensor 513. Preferably, light blocking walls are arranged between the light sensor 513 and the light sources 511 and 511'.

The processor 53 is, for example, an MCU or an ASIC, which receives a first detection signal Sd1 when the first light source 511 is emitting light and receives a second detection signal Sd2 when the second light source 511' is emitting light. In one aspect, the first light source 511 and the second light source 511' emit light within different intervals such that the first light source 511 does not contribute intensity of the second detection signal Sd2 and the second light source 511' does not contribute intensity of the first detection signal Sd1.

The processor 53 distinguishes the smoke 80 or the floating particles 90' according to the similarly between the first detection signal Sd1 and the second detection signal Sd2. For example, when a difference or standard deviation between the first detection signal Sd1 and the second detection signal Sd2 is smaller than a predetermined threshold, the first detection signal Sd1 and the second detection signal Sd2 are similar; otherwise the first detection signal Sd1 and the second detection signal Sd2 are not similar.

For example referring to FIG. 5B, when the first light source 511 and the second light source 511' are sequentially turned on, the processor 53 sequentially receives the first detection signal Sd1 and the second detection signal Sd2. When there is smoke 80 entering the inner space (i.e. sensing space) of the smoke detector 500, the smoke 80 is uniformly distributed inside the cover 52 such that the first reflected light RL1 and the second reflected light RL2 have substantially identical intensity such that normalized intensity (Sd1−Sdr1)/Sdr1 and (Sd2−Sdr2)/Sdr2 (or Sd1/Sdr1 and Sd2/Sdr2) are substantially identical, wherein Sdr1 is the first detection signal (or reference detection signal) when there is no smoke or particles entering the sensing space, and Sdr2 is the second detection signal (or reference detection signal) when there is no smoke or particles entering the sensing space. The intensity normalization of the detection signal is to remove the influence of emission decay of light sources 511 and 511'.

However, when there are particles 90' entering the cover 52, the particles 90' are generally not uniformly distributed inside the cover 52 due to the wind direction and/or small quantity such that the first reflected light RL1 and the second reflected light RL1 have different intensity to cause the first detection signal Sd1 and the second detection signal Sd2 to be different. Accordingly, the processor 53 distinguishes the disturbance caused by floating particles 90' by arranging light sources having an identical wavelength at different sides of the light sensor 513 to decrease the false alarm rate. In this way, the processor 53 identifies the intensity variation between the smoke 80 and the floating particles 90'.

It should be mentioned that although FIG. 5A shows that 511 and 511' are symmetrical to (e.g., both separated by distance d) the light sensor 513, and 512 and 512' are symmetrical to (e.g., both separated by distance d) the light sensor 513, the present disclosure is not limited thereto. In other aspects, 511' is arranged at the position of 512' or 511 is arranged at the position of 512, i.e. not parallel to a transverse direction in FIG. 5A.

Furthermore, in the third embodiment, light sources having different emission wavelengths are arranged at the same side of the light sensor 513, e.g., arranging a third light source 512 and the first light source 511 at the same side of the light sensor 513, or arranging a third light source 512' and the second light source 511' at the same side of the light sensor 513, or arranging two third light sources 512 and 512' respectively at two opposite sides of the light sensor 513. The third light source 512 (or 512') emits light having a wavelength different from light wavelengths of the first light source 511 and the second light source 511'. In this aspect, the processor 53 further receives a third detection signal Sd3 from the light sensor 513 when the third light source 512 and/or 512' is emitting light, not together with the light emission of the light sources 511 and 511'. The processor 53 identifies a type of smoke or particles according to a relationship of features between the normalized intensity (Sd1−Sdr1)/Sdr1 (or the normalized intensity (Sd2−Sdr2)/Sdr2) and the normalized intensity (Sd3−Sdr3)/Sdr3, wherein Sdr3 is the third detection signal (or reference detection signal) when there is no smoke or particles entering the sensing space.

Figure 7A:
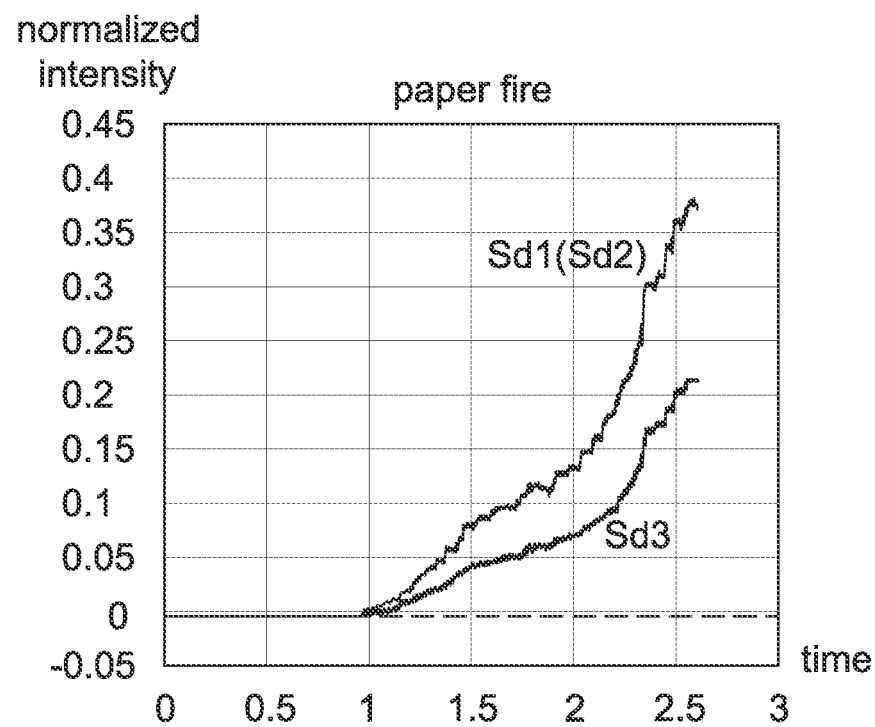
FIGS. 7A to 7C are schematic diagrams of detection signals of different types of smoke detected by a smoke detector of the present disclosure.
Figure 7B:
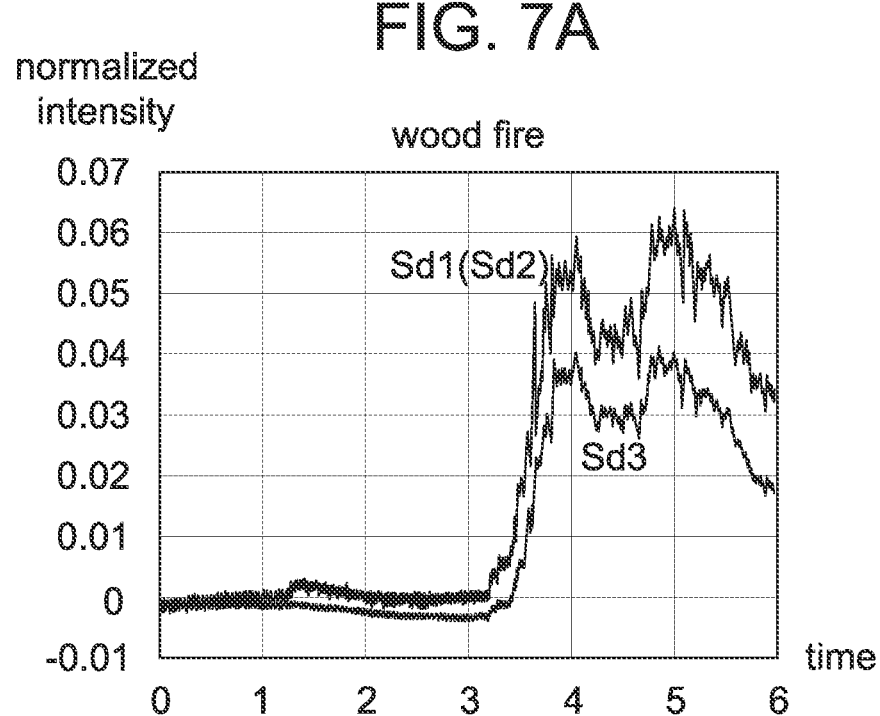
Figure 7C:
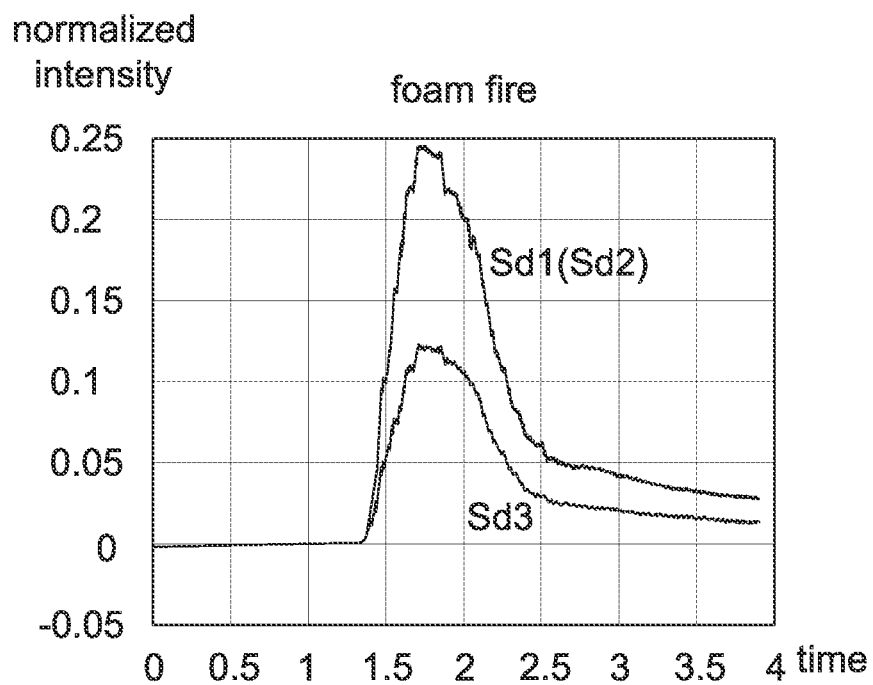

For example referring to FIGS. 7A-7C, although the first light source 511 and the third light source 512 emit light of different wavelengths, when the smoke 80 enters the inner space of the smoke detector 500, the first detection signal Sd1 and the third detection signal Sd3 have similar intensity variations (or trends). Accordingly, the processor 53 recognizes whether the disturbance is caused by the smoke 80 according to features of the detection signal Sd1 and Sd3, wherein the features include the normalized intensity, moving averages with time, slopes, standard deviations, peak pitches (or distances) and the used filter types of the first detection signal Sd1 and the third detection signal Sd3, but the features are not limited to those mentioned herein.

Accordingly, when the first detection signal Sd1 and the third detection signal Sd3 have different intensity variations (or different features), the processor 53 identifies the disturbance as the floating particles 90' due to low similarity therebetween. On the other hand, when the first detection signal Sd1 and the third detection signal Sd3 have substantially identical intensity variation (or identical features), the processor 53 identifies that there is smoke 80 entering the inner space due to the high similarity. In this way, the smoke detector 500 is able to eliminate the disturbance caused by the particles 90' thereby reducing the false alarm rate.

According to the above identification method, if a third light source 512' is arranged adjacent to the second light source 511', the processor 53 compares features between the second detection signal Sd2 and the third detection signal Sd3 to distinguish the smoke and the floating particles.

Furthermore, the processor (e.g., including 13, 33 and 53) of the smoke detector (e.g., including 100, 300, 400 and 500) of the present disclosure further selects one set of condition thresholds from multiple sets of predetermined condition thresholds according to a profile or above mentioned feature of a current detection signal generated by the light sensor (e.g., including 113, 313, 413 and 513), and the selected one set of condition thresholds are compared with the current detection signal to determine whether to give an alarm.

For example referring to FIG. 6, it shows that one set of condition thresholds is previously arranged respectively corresponding to different detection signal profiles (e.g., profile 1 to profile 4) and different smoke types (e.g., type 1 to type 2). That is, A1 to A4 (different from one another), B1 to B4 (different from one another) and C1 to C4 (different from one another) are thresholds associated with different features. In the present disclosure, when all thresholds in one set of condition thresholds are fulfilled, the smoke detector generates an alarm.

In one aspect, when the smoke detector of the present disclosure includes the light source of a single wavelength, the processor sets or selects currently used one set of condition thresholds according to a current detection signal, e.g., Sd3 shown in FIGS. 7A to 7C. For example, when the processor identifies that a slope of the current normalized intensity (Sd3−Sdr3)/Sdr3 or Sd3/Sdr3 is larger than B1, the set of predetermined condition thresholds corresponding to the profile 1 in FIG. 6 is selected; therefore, when the intensity of the current normalized intensity (Sd3−Sdr3)/Sdr3 or Sd3/Sdr3 is larger than A1, the smoke detector generates an alarm. However, during the detection and before the alarm is given, when the processor identifies that the slope of the current normalized intensity (Sd3−Sdr3)/Sdr3 or Sd3/Sdr3 is larger than B2 (e.g., B2>B1), the set of predetermined condition thresholds corresponding to the profile 2 in FIG. 6 is selected; therefore, when the intensity of the current normalized intensity (Sd3−Sdr3)/Sdr3 or Sd3/Sdr3 is larger than A2, the smoke detector generates an alarm. In other words, during the operation of the smoke detector of the present disclosure, when identifying that the profile of the detection signal is changed with time, the processor actively selects another set of condition thresholds among the multiple sets of predetermined condition thresholds (e.g., 4 sets being shown in FIG. 6, but not limited to). In this way, the condition thresholds are dynamically changed corresponding to actual conditions so as to decrease the false alarm rate.

It should be mentioned that although FIG. 6 shows multiple sets of predetermined condition thresholds, the present disclosure is not limited thereto. In other aspects, the smoke detector of the present disclosure is embedded with (e.g., in the memory) multiple sets of predetermined condition threshold ranges (i.e. including upper and lower thresholds).

In one aspect, when the smoke detector of the present disclosure includes light sources of different wavelengths (i.e. different main wavelengths), each set of predetermined condition thresholds further include a signal ratio (or feature ratio) between detection signals of different wavelengths. For example, when the processor identifies that a slope of the current normalized intensity (Sd3−Sdr3)/Sdr3 or Sd3/Sdr3 is larger than B1, the alarm is generated only when the intensity of the current normalized intensity (Sd3−Sdr3)/Sdr3 or Sd3/Sdr3 is larger than A1 and the signal ratio (or feature ratio) between the detection signals (e.g., Sd3 and Sd1) or between the normalized intensity of two wavelengths is smaller than C1.

It should be mentioned that a number of the condition thresholds in one set of predetermined condition thresholds is not particularly limited.

In the present disclosure, the multiple sets of predetermined condition thresholds are previously stored in a memory of the processor, and the user is able to change the used multiple sets of predetermined condition thresholds according to the requirement, e.g., different multiple sets of predetermined condition thresholds are selected corresponding to different national standards (e.g., including UL268 and UL217 of America, and EN1464 and EN54 of Europe, but not limited thereto), or corresponding to different arrangement environment (e.g., indoor and outdoor). More specifically, the smoke detector of the present disclosure is embedded with selectable or changeable multiple sets of predetermined condition thresholds for different operation environments.

Furthermore, as shown in FIGS. 7A to 7C, because the paper fire, wood fire and foam fire generate different smoke to cause the detection signals to be different and the relationship of features to be different. The processor of the present disclosure further selects a different set of condition thresholds from the multiple sets of predetermined condition thresholds according to different types of smoke. For example, the processor of the present disclosure is embedded with a categorizer implemented by hardware and/or firmware. When receiving at least one detection signal (e.g., at least one of Sd1, Sd2, Sd3), the processor categorizes a type of current smoke according to the feature of one detection signal or a relationship of features between two detection signals. Next, the processor selects one set of predetermined condition thresholds according to the determined type of smoke (e.g., type 1 to type 4 shown in FIG. 6). In FIGS. 7A to 7C, the vertical axis is shown as normalized intensity of the detection signal. For example, the processor calculates, in the initial state, an average signal values within a predetermined interval (e.g., 10 seconds) as a reference value, and then during operation the processor divides current values of the detection signal by this reference value and then minus 1 (configured as the normalized intensity) to obtain the detection signals Sd1 to Sd3 in FIGS. 7A to 7C.

In FIG. 6, the interval 1 to interval 4 are referred to a time interval respectively, and the alarm is given when all predetermined condition thresholds are fulfilled within the predetermined time interval.

It should be mentioned that although FIG. 6 shows that the smoke type and the detection signal profile have corresponding set of predetermined condition thresholds, the present disclosure is not limited thereto. In other aspects, the smoke type and the detection signal profile are associated with totally different sets of predetermined condition thresholds. That is, the smoke type and the detection signal profile determine different sets of condition thresholds.

Figure 8A:
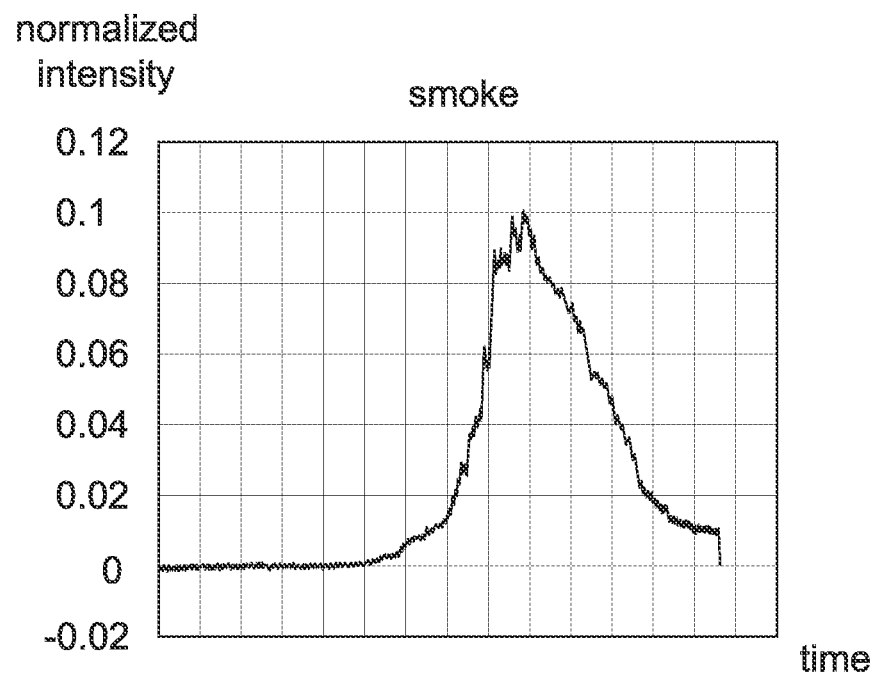
FIGS. 8A to 8C are schematic diagrams of detection signals of different objects detected by a smoke detector of the present disclosure.
Figure 8B:
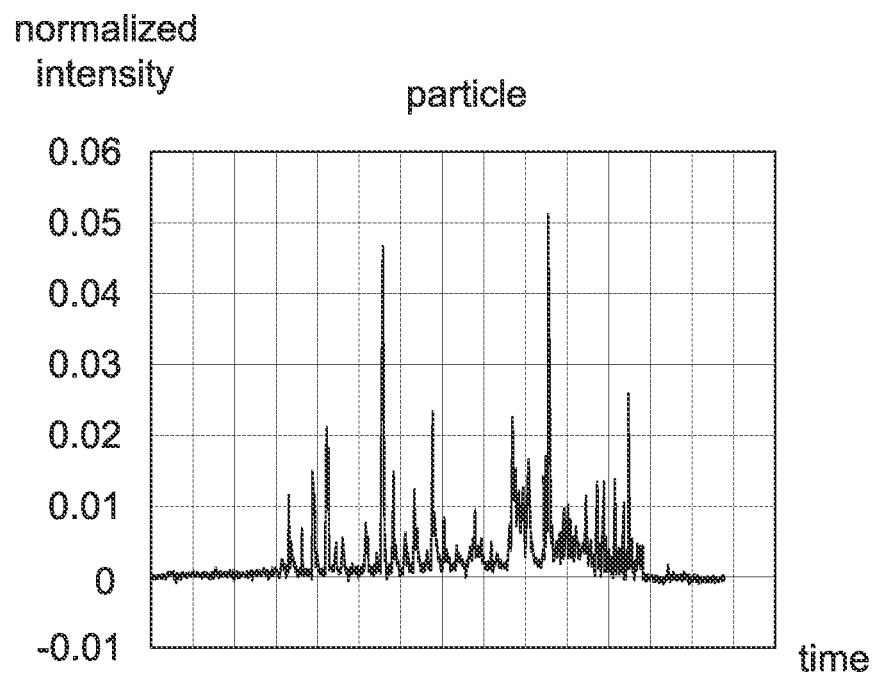
Figure 8C:
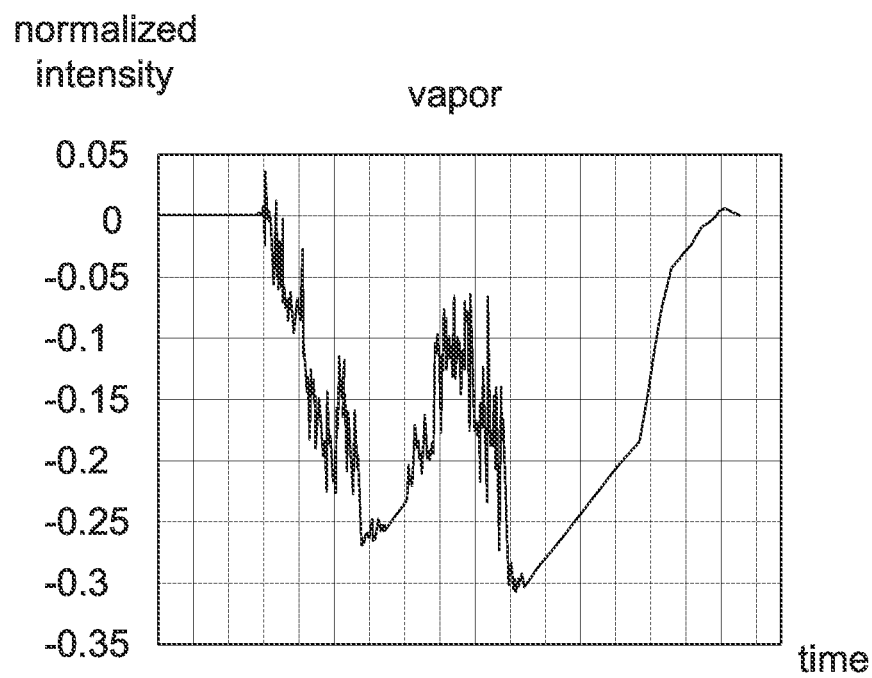

In addition to recognizing different types of smoke, the smoke detector of the present disclosure further recognizes whether the detection signal is changed by the smoke of fire. For example, as shown in FIG. 8A to 8C, the smoke, particle and vapor generate different profiles of detection signals (or called intensity variation). When the processor of the present disclosure identifies the detection signal has a signal variation (e.g., larger than TH1 as shown in FIG. 9), the categorizer embedded therein firstly identifies whether the signal change is caused by the fire. For example, when the categorizer identifies that the profile of the detection signal is belong to particle, vapor or caused by other non-flame objects, the processor does not compare the feature of the detection signal with any set of predetermined condition thresholds to avoid the false alarm. When the categorizer identifies that the profile of the detection signal is caused by the fire, the processor further selects one set of predetermined condition thresholds suitable to the current condition (determined according to the feature of a current detection signal), and then compares the selected set of condition thresholds with the followed detection values so as to determine whether to give an alarm.

Furthermore, the smoke detector (e.g., including 100, 300, 400 and 500) of the present disclosure further changes a sensing frequency according to the current detection signal so as to reduce the response time. For example referring to FIG. 9, in the initial state (e.g., no significant change in the detection signal), the light sensor of the smoke detector generates the detection signal using a first sensing frequency. When the processor identifies that the normalized intensity of the detection signal is larger than or equal to a first threshold TH1, it means that there might be a fire occurred and thus the processor controls the light sensor to increase to a second sensing frequency (also increasing the flicker frequency of the light source). When the processor identifies that the normalized intensity of the detection signal is larger than or equal to a second threshold TH2, the alarm is generated.

It should be mentioned that although FIG. 9 shows that the alarm condition is fulfilled when the normalized intensity exceeds a second threshold TH2, the present disclosure is not limited thereto. In other aspects, the alarm condition is satisfied when one set of predetermined condition thresholds as shown in FIG. 6 are fulfilled.

Similarly, the first threshold TH1 is replaced by one set of predetermined condition thresholds instead of using a single threshold. Meanwhile, the first threshold TH1 and the second threshold TH2 are dynamically or actively changed according to the standard, current detection signal and smoke type as mentioned above instead of being altered manually by a user or maintained as a fixed value.

It should be mentioned that the detection signal mentioned in descriptions of FIGS. 7A to 7C, FIGS. 8A to 8C and FIG. 9 are those detection signals mentioned in the first embodiment to the third embodiment. In other words, the processor in the first embodiment to the third embodiment selects one set of predetermined condition thresholds, recognize disturbance and/or adjust sensing frequency according to a current detection signal.

In the present disclosure, the term "particle" is referred to the substance floating in the air, and the term "dust" is referred to the substance accumulated in the bottom of cover for the illustration purposes.

In the present disclosure, the normalized intensity is calculated using, for example, (current detection value/reference value) as FIG. 9, or calculated using (current detection value/reference value)−1 as FIGS. 7A to 7C and 8A to 8C.

In the present disclosure, in distinguishing the smoke, dust or particles, in identifying the smoke type and in determining whether to give alarm, the current detection signal is firstly normalized by a reference detection signal by the processor so as to eliminate the influence of emission decay of the light source.

As mentioned above, an optical smoke detector identifies whether to give an alarm according to a signal ratio of a current detection signal Sdc with respect to a reference detection signal Sdr, e.g., (Sdc−Sdr)/Sdr, wherein (Sdc−Sdr) is also called scattered light intensity herein. However, the reference detection signal Sdr can change with the ambient temperature variation and the assembly misalignment to cause false alarm. By increasing the signal ratio of the current detection signal Sdc with respect to the reference detection signal Sdr, it is able to reduce the false alarm rate.

Figure 10A:
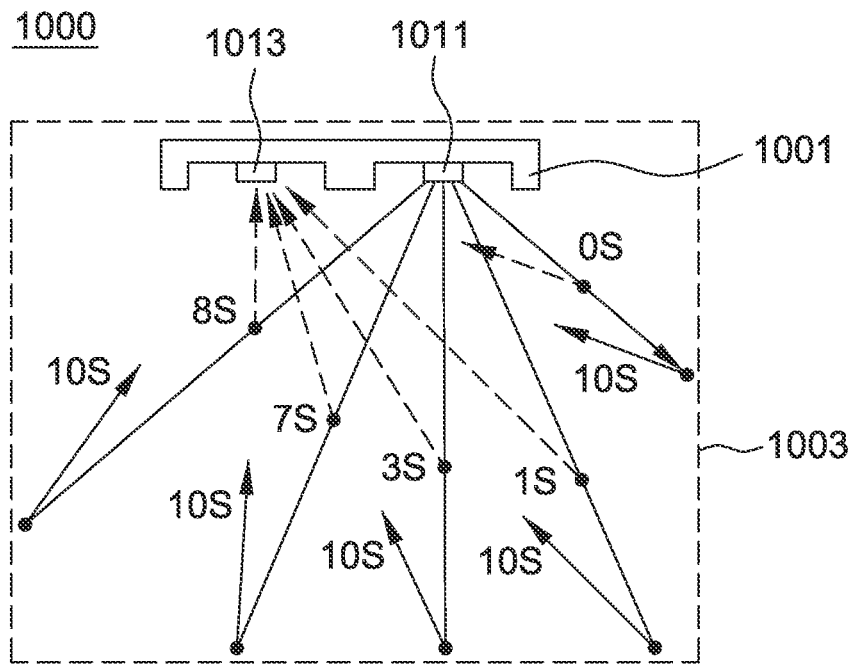
FIGS. 10A and 10B are schematic diagrams of light propagation inside a smoke detector according to some embodiments of the present disclosure.
Figure 10B:
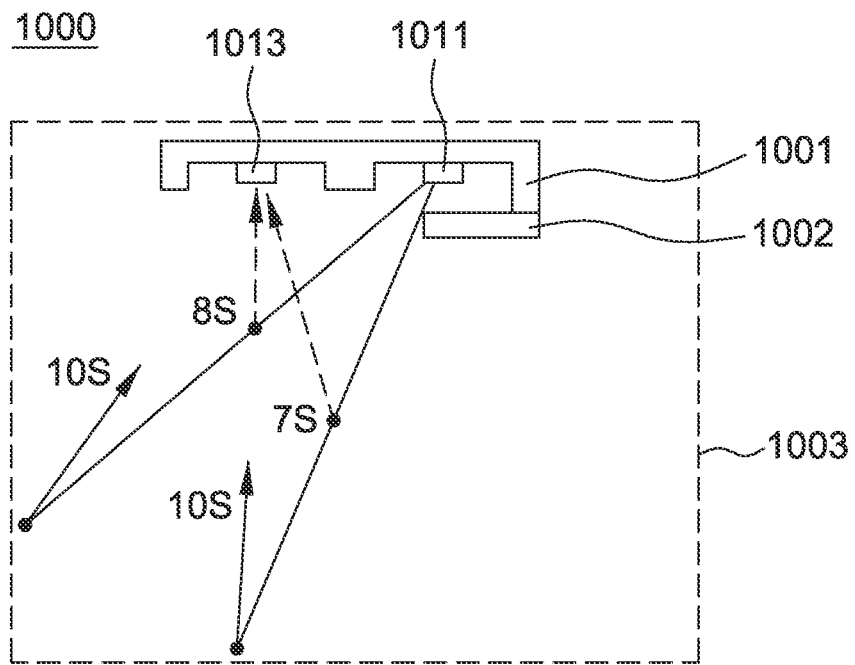

Please refer to FIGS. 10A and 10B, they are schematic diagrams of light propagation in a smoke detector 1000 according to some embodiments of the present disclosure. FIG. 10A shows the smoke detector 1000 includes an optical machine 1001 and a cover 1003.

A light source 1011 of the optical machine 1001 emits light to illuminate an inner space inside the cover 1003 and particles (e.g., smoke, shown by circle dots not at the inner surface) within the cover 1003. It is assumed that reflection light intensity of each point of the inner surface is 10S (detected by a light sensor 1013), and particles at different locations have difference reflection light intensity, e.g., shown as 0S, 1S, 3S, 7S and 8S, but not limited thereto. In this case, a total reflection light intensity of particles is 19S (or referred to scattered light intensity), and a total reflection light intensity from the inner surface is 50S (i.e. reference light intensity for generating detection signals), and thus a ratio thereof is 0.38. FIG. 10B shows that the smoke detector

1000 is further arranged with a light blocking member 1002 which blocks a part of emission angle of the light source 1011 such that only a part of region inside the cover 1003 generates reflection light. In this case, a total reflection light intensity of particles is 15S, and a total reflection light intensity from the inner surface is 20S, and thus a ratio thereof is 0.75. That is, by arranging the light blocking member 1002, the ratio of the reflection light intensity of smoke with respect to the reference light intensity is significantly increased, to accordingly improve detection sensitivity of the smoke detector 1000.

However, a coverage ratio of the light source 1011 being blocked by the light blocking member 1002 is not unlimited. Since whether to give an alarm is identified by using both reference light intensity and scattered light intensity, if the reference light intensity is too weak, the scattered light intensity can have significant fluctuation corresponding to different conditions.

Figure 11:
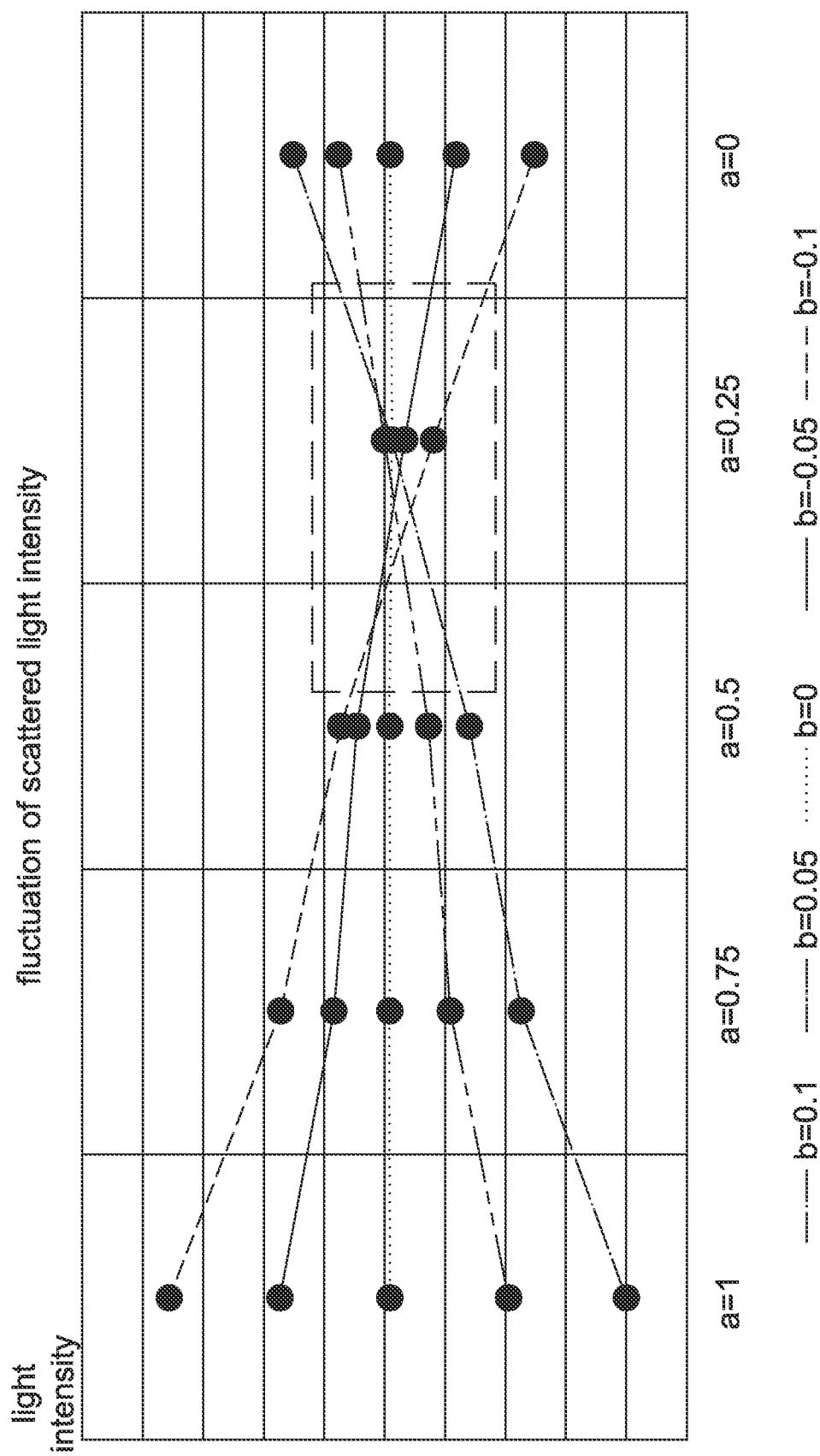
FIG. 11 is a diagram of scattered light intensity detected by a smoke detector corresponding to different light coverage ratios and light source deviations.

For example referring to FIG. 11, it shows the fluctuation of scattered light intensity, under different coverage ratio "a" of the light source 1011 (e.g., a=0 indicating not covered; and a=1 indicating fully covered), corresponding to different position deviations of the light source 1011 (e.g., b=0 indicating no deviation; b=negative values indicating shifted toward the light sensor 1013; b=positive values indicating shifted in an opposite direction from the light sensor 1013). The vertical axis of FIG. 11 indicates light intensity. It is seen from FIG. 11 that when the coverage ratio of the light source 1011 is between 10% and 40% (i.e. a=0.1 to a=0.4), the scattered light intensity receives a smaller influence from different position deviations of the light source 1011. FIG. 11 shows that the coverage ratio is preferably selected close to 25%. That is, the light blocking member 1002 in FIG. 10B blocks ¼ right part of the light source 1001.

The objective of arranging the light blocking member 1002 is to reduce the reference light intensity. However, it is noticed that it is able to achieve the same objective by increasing the scattered light intensity. Other optical smoke detectors of the present disclosure are provided hereinafter which are capable of achieving the same effect as arranging the light blocking member 1002, i.e. increasing a value of (Sdc−Sdr)/Sdr. In drawings associated with embodiments blow, the processor, which performs the above mentioned functions, is omitted for simplification purpose.

Figure 12:
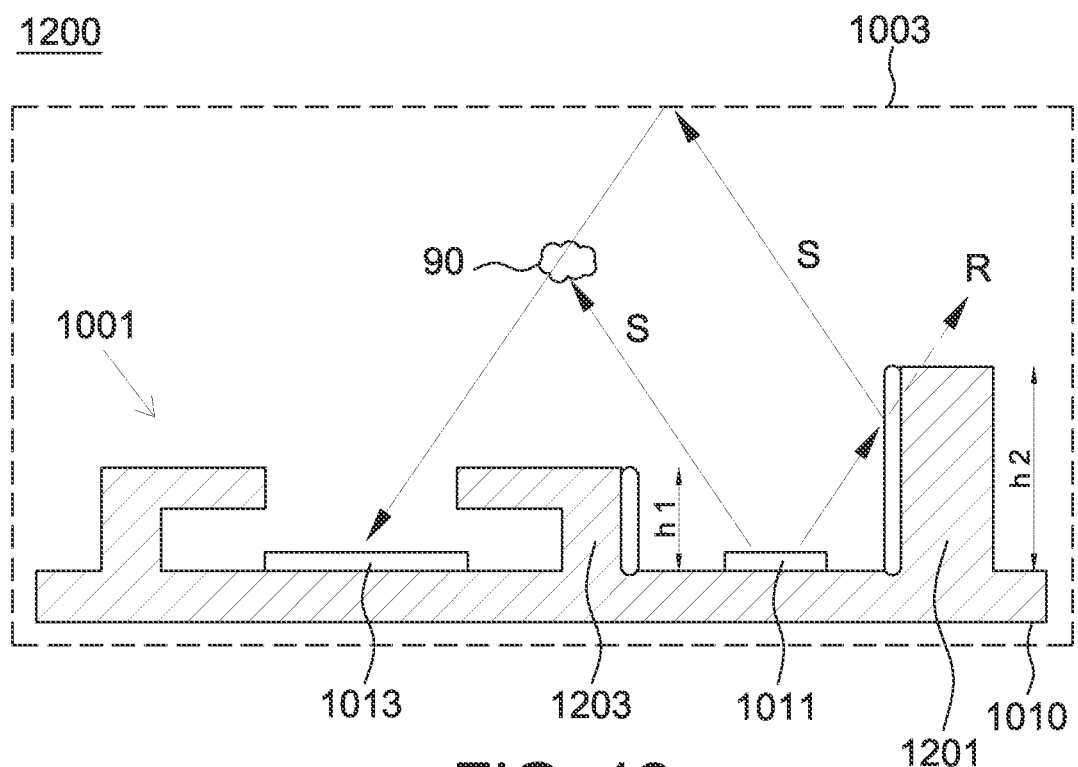
FIGS. 12 and 13 are cross sectional views of some smoke detectors according to a fourth embodiment of the present disclosure.
Figure 13:
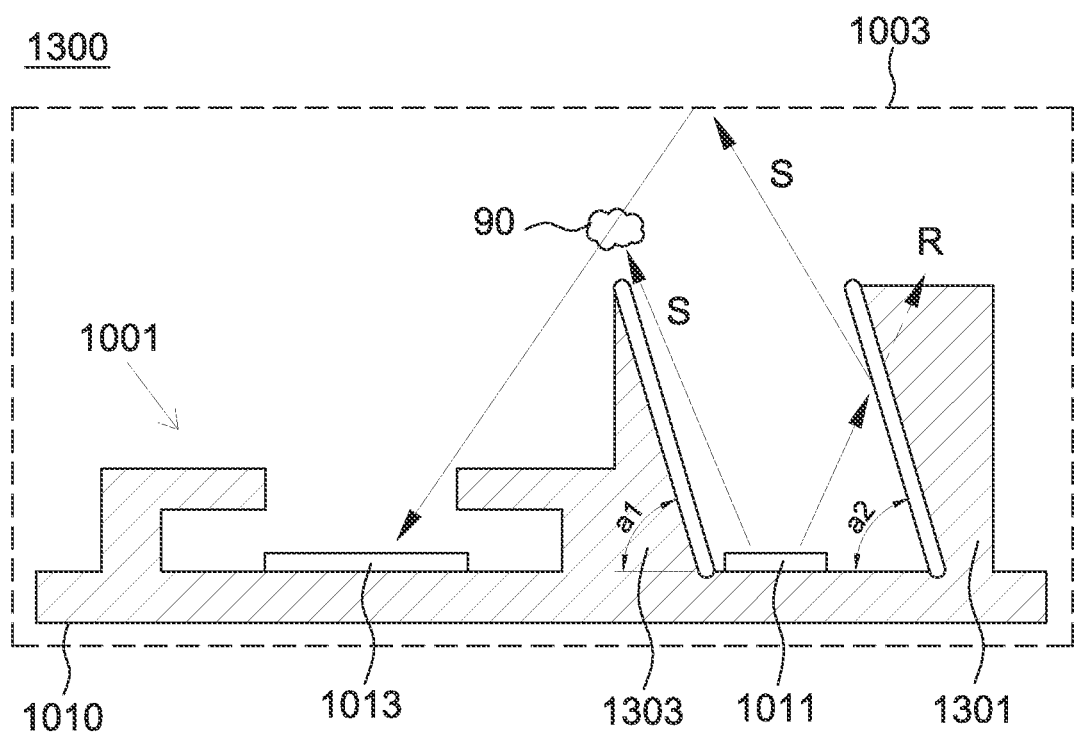

Please refer to FIGS. 12 and 13, they are cross sectional views of some smoke detectors 1200 and 1300 according to a fourth embodiment of the present disclosure. The smoke detectors 1200 and 1300 include an optical machine 1001 and a cover 1003, wherein details of the cover 1003 have being illustrated above and thus are not repeated herein.

The optical machine 1001 includes a substrate 1010, a light source 1011 and a light sensor 1013, wherein the light source 1011 and the light sensor 1013 are arranged on an upper surface of the substrate 1010. The substrate 1010 is a printed circuit board (PCB) or a flexible board without particular limitations. The light source 1011 and the light sensor 1013 are respectively identical to the light source 111 and the light sensor 113 mentioned in the above embodiments, and thus details thereof are not repeated herein.

The optical machine 1001 is further arranged with a ring wall on the upper surface of the substrate 1010, and surrounding the light source 1011 and the light sensor 113. The ring wall is made of opaque material, and is used to limit an illumination region of the light source 1011 and a light receiving region of the light sensor 113. The ring wall can prevent light emitted from the light source 1011 from directly propagating to the light sensor 113. In this embodiment, the ring wall is further arranged in the way to move the illumination region of the light source 1011 toward the light sensor 1013, e.g., a wall at right hand side of the cover 1003 not being illuminated by the light source 1011 so as to reduce reference light (e.g., shown as R) intensity and to increase intensity of reflected light (i.e. scattered light intensity, shown as S) reflected by smoke 90.

In this embodiment, an inner surface of the ring wall is a reflective surface, e.g., formed by coating metal material on the inner surface or polishing the inner surface, but not limited to. It is possible to form the reflective surface using other ways.

In FIG. 12, the ring wall adjacent to the light source 1011 is perpendicular to the upper surface of the substrate 1010. In the ring wall adjacent to the light source 1011, a first part 1201 of the ring wall farther from the light sensor 1013 (e.g., shown at right side of the light source 1011 in FIG. 12) is higher than a second part 1203 of the ring wall closer to the light sensor 1013 (e.g., shown at left side of the light source 1011 in FIG. 12) such that reference light R propagating toward a side wall at the right hand side of the cover 1003 is reflected by the first part 1201 to increase intensity of reflected light S reflected by smoke 90. In one aspect, a height of the first part 1201 is more than double of a height of the second part 1203, and a thickness of the first part 1201 in a transverse direction of FIG. 12 is not particularly limited. Other parts of the ring wall connecting the first part 1201 and the second part 1203 are arranged to have the same height as the second part 1203, or to have a height gradually increasing from the second part 1203 to the first part 1201 without particular limitations.

In FIG. 13, the ring wall adjacent to the light source 1011 also includes a first part 1301 farther from the light sensor 1013 (e.g., shown at right side of the light source 1011 in FIG. 13) and a second part 1303 closer to the light sensor 1013 (e.g., shown at left side of the light source 1011 in FIG. 13). To achieve similar effects as FIG. 12, the first part 1301 is tilted toward the light sensor 1013, e.g., having a tilted angle a2. FIG. 13 shows that the second part 1303 is also tilted toward the light sensor 1013, e.g., having a tilted angle a1. In FIG. 13, a2 is identical to or different from a1 without particular limitations, e.g., a1 and a2 being smaller than 90 degrees and larger than 0 degree, or a1 and a2 being smaller than 90 degrees and larger than 45 degrees. In another aspect, the second part 1303 is perpendicular to the upper surface of the substrate 1010 without being tilted toward the light sensor 1013, and only the first part 1301 is tilted toward the light sensor 1013. Other parts of the ring wall connecting the first part 1301 and the second part 1303 are arranged to be perpendicular to the upper surface of the substrate 1010 without being tilted, and an inner surface of said other parts is arranged as a reflective surface or not.

Furthermore, although FIG. 13 shows that the first part 1301 and the second part 1303 have substantially identical heights, the present disclosure is not limited thereto. In other aspects, the first part 1301 is higher (or longer) than the second part, similar to FIG. 12 but with tilted angles.

It should be mentioned that although FIG. 12 and FIG. 13 show that the inner surface of the ring wall adjacent to the light source 1011 is a reflective surface (or mirror surface) so as to increase intensity of reflected light S reflected by smoke 90, the present disclosure is not limited thereto. In other aspects, the inner surface of the ring wall is not further processed to form a reflective surface.

Figure 14A:
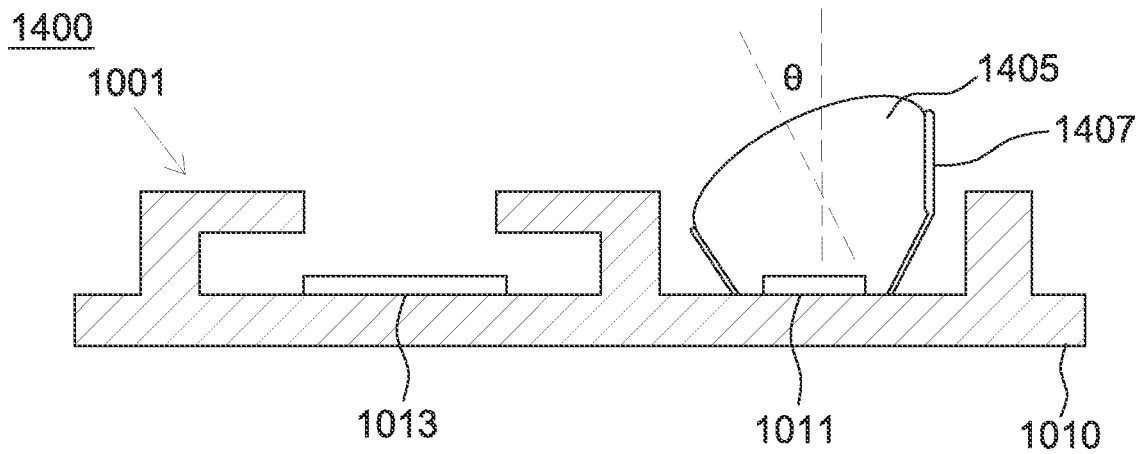
FIGS. 14A to 14C are cross sectional views of some smoke detectors according to a fifth embodiment of the present disclosure.
Figure 14B:
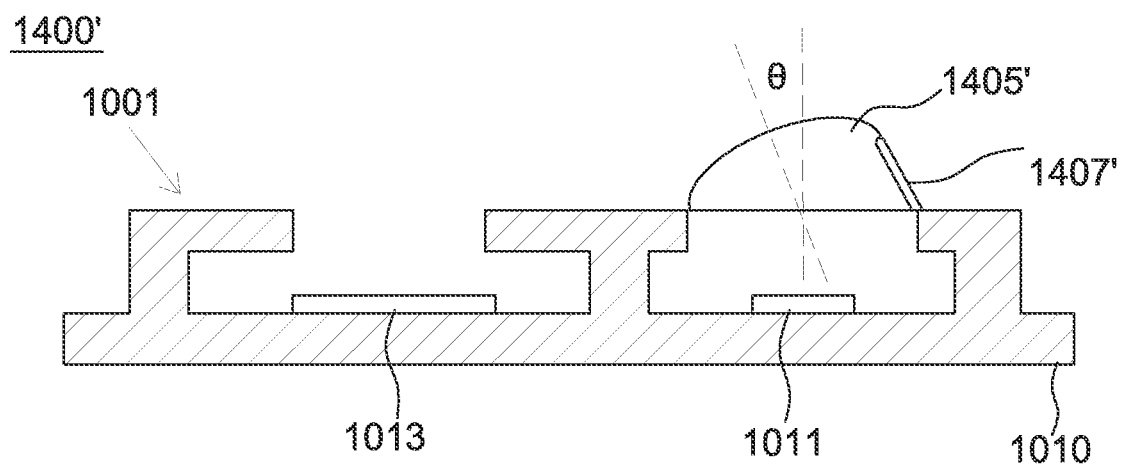
Figure 14C:
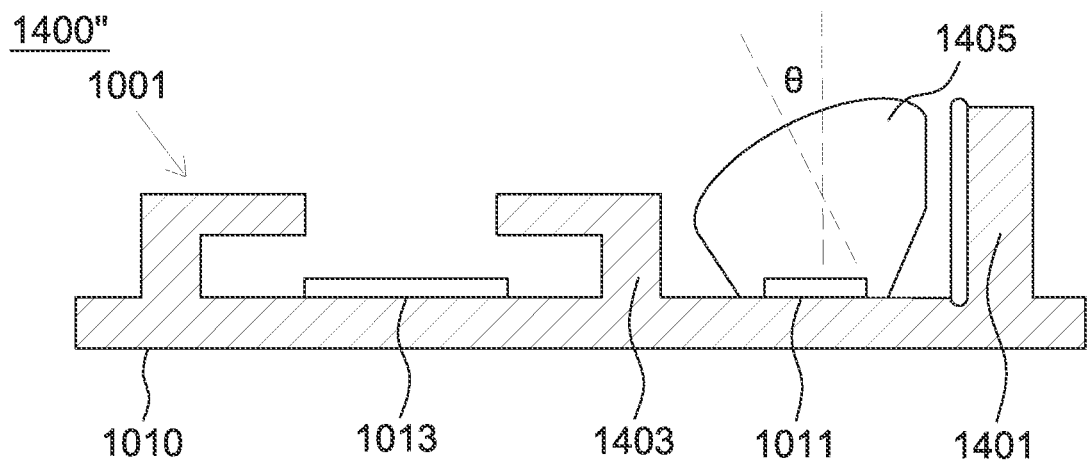

Please refer to FIG. 14A to FIG. 14C, they are cross sectional views of some smoke detectors 1400, 1400', 1400" according to a fifth embodiment of the present disclosure.

The smoke detectors 1400, 1400', 1400" also include a substrate 1010, a light source 1011 and a light sensor 1013. The light source 1011 and the light sensor 1013 are arranged on an upper surface of the substrate 1010, which have been illustrated above and thus are not repeated herein.

The difference between the fifth embodiment and the above fourth embodiment is that the fifth embodiment is to move an illumination region of the light source 1011 toward the light sensor 1013 by adopting a light directing element. For simplification purposes, FIGS. 14A to 14C omit the cover 1003.

In FIG. 14A, the light directing element includes a lens 1405 and a light reflecting member 1407. The lens 1405 is made of plastic material or glass material. An optical axis of the lens 1405 is tilted an angle θ toward the light sensor 1013, wherein the angle θ is preferably larger than 20 degrees and smaller than 45 degrees. The light reflecting member 1407 is arranged at a peripheral surface of the lens 1405 to avoid light leakage from the peripheral surface of the lens 1405. In one aspect, in conjunction with the inclination of the lens 1405, a first reflecting part of the light reflecting member 1407 farther from the light sensor 1013 (e.g., shown at right side of the light source 1011 in FIG. 14A) is higher than a second reflecting part of the light reflecting member 1407 closer to the light sensor 1013 (e.g., shown at left side of the light source 1011 in FIG. 14A). Meanwhile, the light directing element is arranged on the upper surface of the substrate 1010 and encapsulating the light source 1011.

In FIG. 14B, the light directing element includes a lens 1405' and a light reflecting member 1407'. In this aspect, a ring wall is arranged on the upper surface of the substrate 1010 surrounding the light source 1011 and the light sensor 1013. As mentioned above, the ring wall is used to control the illumination region of the light source 1011 and the light receiving region of the light sensor 1013. In FIG. 14B, the light directing element is mounted on the ring wall adjacent to the light source 1011 and an optical axis of the lens 1405' is also tilted toward the light sensor 1013 by a tilted angle θ such that similar effects to FIG. 14A can be achieved, i.e. reducing light intensity propagating toward a side wall at the right hand side of the cover (not shown) and increasing light intensity propagating toward the light sensor 1013. It should be mentioned that the shape of the ring wall is not limited to that shown in FIG. 14B.

It should be mentioned that although FIG. 14B shows that there is no light reflecting member 1407' at a left side of the lens 1405', the present disclosure is not limited thereto. If the lens 1405' has a larger thickness or has a smaller tilted angle θ, the left side of the lens 1405' is arranged with the light reflecting member 1407' similar to FIG. 14A.

In addition, the embodiment of FIG. 14A is combinable to FIG. 12, e.g., shown in FIG. 14C. In FIG. 14C, the smoke detector 1400" includes a light directing element arranged on the upper surface of the substrate 1010 and inside the ring wall. In this aspect, the peripheral surface of the lens 1405 is not arranged with a light reflecting member, and an inner surface of the ring wall adjacent to the light source 1011 is arranged with a reflective surface. Similar to FIG. 12, a first part 1401 of the ring wall farther from the light sensor 1013 (e.g., shown at right side of the light source 1011 in FIG. 14C) is higher than a second part 1403 of the ring wall closer to the light sensor 1013 (e.g., shown at left side of the light source 1011 in FIG. 14C). Furthermore, the embodiment of FIG. 14C is further combinable to FIG. 13, i.e. the first part 1401 of the ring wall being tilted toward the light sensor 1013. As for the second part 1403 of the ring wall, as mentioned in the above fourth embodiment, the second part 1403 is arranged to be perpendicular to the upper surface of the substrate 1010 or tilted toward the light sensor 1013.

Figure 15A:
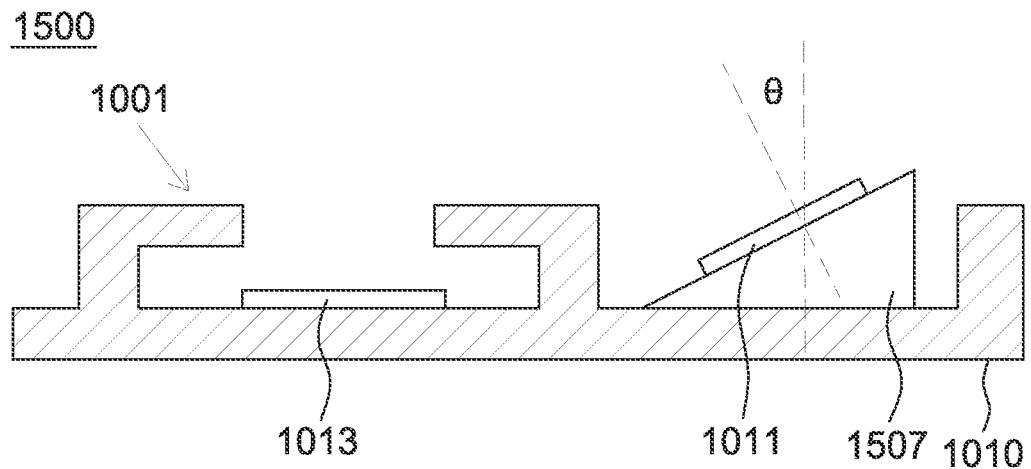
FIGS. 15A and 15B are cross sectional views of some smoke detectors according to a sixth embodiment of the present disclosure.
Figure 15B:
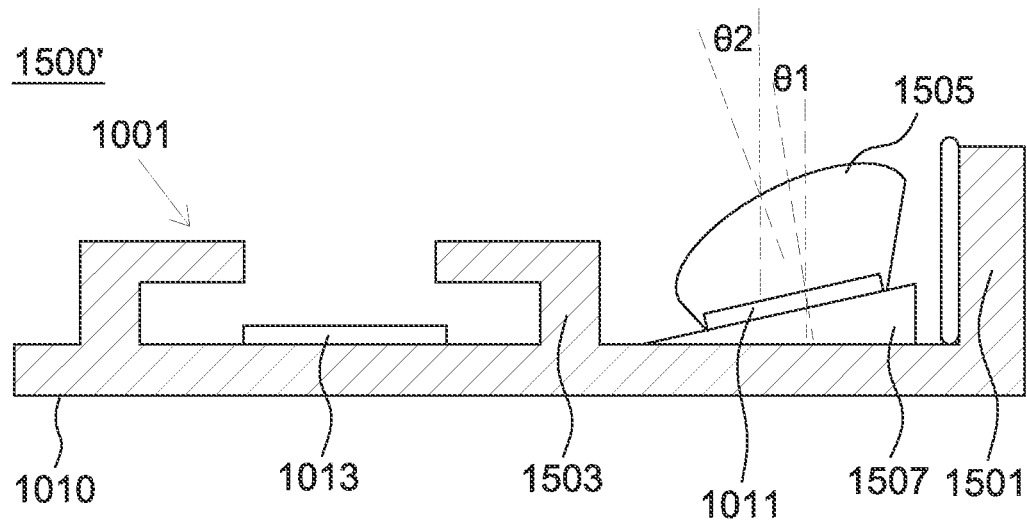

Please refer to FIGS. 15A and 15B, they are cross sectional views of some smoke detectors 1500 and 1500' according to a sixth embodiment of the present disclosure. The smoke detectors 1500 and 1500' also includes a substrate 1010, a light source 1011 and a light sensor 1013, which have been illustrated above and thus are not repeated again.

In the sixth embodiment, a sub-substrate 1507 is further arranged on an upper surface of the substrate 1010. The sub-substrate 1507 is electrically connected to the substrate 1010, and a first surface (i.e. upper surface thereof) of the sub-substrate 1507 is tilted toward the light sensor 1013 by a tilted angle θ, which is preferably larger than 20 degrees and smaller than 45 degrees.

It should be mentioned that although FIG. 15A shows that a cross section of the sub-substrate 1507 is a triangle, the present disclosure is not limited thereto. The cross section of the sub-substrate 1507 is formed as other shapes as long as the upper surface thereof is inclined toward the light sensor 1013.

The sub-substrate 1507 is a printed circuit board or a flexible board without particular limitations as long as it is able to electrically couple the light source 1011 to the substrate 1010.

As shown in FIG. 15A, by arranging the light source 1011 on the first surface of the sub-substrate 1507, it is able to achieve similar effects as the fourth and fifth embodiments mentioned above.

In addition, the embodiment of FIG. 15A is combinable to FIG. 12, as shown in FIG. 15B. In FIG. 15B, the smoke detector 1500' has a ring wall arranged on the upper surface of the substrate 1010 and surrounding the sub-substrate 1507 and the light source 1011. The objective of arranging the ring wall has been illustrated above. The ring wall adjacent to the light source 1011 has a first part 1501 farther from the light sensor 1013 (e.g., shown at right side of the sub-substrate 1507 in FIG. 15B) is higher than a second part 1503 closer to the light sensor 1013 (e.g., shown at left side of the sub-substrate 1507 in FIG. 15B), and an inner surface of at least the first part 1501 is arranged as a reflective surface.

Furthermore, the embodiment of FIG. 15A is combinable to FIG. 14A. That is, the smoke detector 1500' further includes a lens 1505 encapsulating the light source 1011, and an optical axis of the lens 1505 is tilted toward the light sensor 1013 by a tilted angle θ2, which is preferable larger than 10 degrees and smaller than 20 degrees. Meanwhile, the first surface of the sub-substrate 1507 has a tilted angle θ1, which is smaller than θ shown in FIG. 15A, e.g., θ1 being larger than 10 degrees and smaller than 15 degrees. In other words, the same effect of the tilted angle θ of the sub-substrate 1507 shown in FIG. 15A is achieved by using both the tilted angle θ1 of the sub-substrate 1507 and the tilted angle θ2 of the lens 1505 shown in FIG. 15B.

In a word, the smoke detectors in the above fourth embodiment to the sixth embodiment are combinable in other ways without being limited by FIG. 14C and FIG. 15B.

As mentioned above, the conventional smoke detector uses a single threshold such that it is unable to adapted to different environments, e.g., the disturbance amount is different indoor and outdoor. Furthermore, different types of smoke can generate different detection signals to have a higher false alarm rate. Accordingly, the present disclosure further provides a smoke detector having a low false alarm rate (e.g., FIGS. 1B, 3-4 and 5A-5B) that alter the used multiple condition thresholds corresponding to different standards or current detection results to effectively reduce the false alarm rate. In addition, the smoke detector of the present disclosure is further arranged with a light directing structure, including the ring wall, lens and sub-substrate, to move an illumination region of a light source toward a light sensor to further reduce the false alarm rate.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A smoke detector, comprising:
a substrate;
a light source, arranged on an upper surface of the substrate;
a light sensor, arranged on the upper surface of the substrate; and
a ring wall, arranged on the upper surface of the substrate and surrounding the light source, and configured to move an illumination range of the light source toward the light sensor, wherein a first part of the ring wall farther from the light sensor has a height more than double of a height of a second part of the ring wall closer to the light sensor.

2. The smoke detector as claimed in claim 1, wherein an inner surface of the ring wall is a reflective surface, and the ring wall is perpendicular to the upper surface.

3. A smoke detector, comprising:
a substrate;
a light source, arranged on an upper surface of the substrate;
a light sensor, arranged on the upper surface of the substrate; and
a ring wall, arranged on the upper surface of the substrate and surrounding the light source, and configured to move an illumination range of the light source toward the light sensor, wherein
an inner surface of the ring wall is a reflective surface, and
a first part of the ring wall farther from the light sensor is tilted toward the light sensor.

4. The smoke detector as claimed in claim 3, wherein a second part of the ring wall closer to the light sensor is perpendicular to the upper surface.

5. The smoke detector as claimed in claim 3, wherein a second part of the ring wall closer to the light sensor is tilted toward the light sensor.

6. The smoke detector as claimed in claim 5, wherein tilted angles of the first part and the second part of the ring wall are identical.

7. The smoke detector as claimed in claim 5, wherein tilted angles of the first part and the second part of the ring wall are different from each other.

8. The smoke detector as claimed in claim 5, wherein the first part of the ring wall has a height higher than that of the second part of the ring wall.

9. A smoke detector, comprising:
a substrate;
a light source, arranged on an upper surface of the substrate;
a light sensor, arranged on the upper surface of the substrate; and
a light directing element, configured to move an illumination range of the light source toward to light sensor, and the light directing element comprising:
a lens, an optical axis thereof being tilted toward the light sensor; and
a light reflecting member, arranged on a peripheral surface of the lens, and a first reflecting part of the light reflecting member farther from the light sensor is higher than a second reflecting part of the light reflecting member closer to the light sensor.

10. The smoke detector as claimed in claim 9, wherein a tilted angle of the optical axis of the lens is larger than 20 degrees and smaller than 45 degrees.

11. The smoke detector as claimed in claim 9, wherein the light directing element is arranged on the upper surface of the substrate.

12. The smoke detector as claimed in claim 9, further comprising:
a ring wall, arranged on the upper surface of the substrate and surrounding the light source,
wherein the light directing element is mounted on the ring wall.

13. The smoke detector as claimed in claim 9, further comprising:
a ring wall, arranged on the upper surface of the substrate and surrounding the light source, wherein
the light directing element is arranged on the upper surface of the substrate and inside the ring wall,
an inner surface of the ring wall is a reflective surface, and
a first part of the ring wall farther from the light sensor is higher than a second part of the ring wall closer to the light sensor.

14. The smoke detector as claimed in claim 9, further comprising:
a ring wall, arranged on the upper surface of the substrate and surrounding the light source, wherein
the light directing element is arranged on the upper surface of the substrate and inside the ring wall,
an inner surface of the ring wall is a reflective surface, and
a first part of the ring wall farther from the light sensor is tilted toward the light sensor.

* * * * *